(12) United States Patent
Thomas

(10) Patent No.: US 9,910,843 B2
(45) Date of Patent: Mar. 6, 2018

(54) SYSTEMS, METHODS AND ARTICLES FOR A WEB-BASED SPREADSHEET APPLICATION

(71) Applicant: Intuit Inc., Mountain View, CA (US)

(72) Inventor: Peter Thomas, Karnataka (IN)

(73) Assignee: INTUIT INC., Mountain View, CA (US)

( * ) Notice: Subject to any disclaimer, the term of this patent is extended or adjusted under 35 U.S.C. 154(b) by 300 days.

(21) Appl. No.: 14/613,263

(22) Filed: Feb. 3, 2015

(65) Prior Publication Data

US 2016/0224536 A1    Aug. 4, 2016

(51) Int. Cl.
  *G06F 17/00*  (2006.01)
  *G06F 17/24*  (2006.01)
  *G06F 17/21*  (2006.01)

(52) U.S. Cl.
  CPC .......... *G06F 17/246* (2013.01); *G06F 17/211* (2013.01)

(58) Field of Classification Search
  CPC .............................. G06F 17/212; G06F 17/246
  See application file for complete search history.

(56) References Cited

U.S. PATENT DOCUMENTS

| | | | |
|---|---|---|---|
| 5,819,293 A * | 10/1998 | Comer | G06F 17/243 |
| 6,988,241 B1 | 1/2006 | Guttman et al. | |
| 7,233,951 B1 | 6/2007 | Gainer et al. | |
| 7,673,227 B2 | 3/2010 | Kotler et al. | |
| 7,752,536 B2 | 7/2010 | Megiddo et al. | |
| 8,055,995 B2 | 11/2011 | Sambandam et al. | |
| 8,122,061 B1 * | 2/2012 | Guinness | G06F 17/30292 706/11 |
| 8,307,119 B2 * | 11/2012 | Rochelle | G06F 17/246 709/201 |

(Continued)

OTHER PUBLICATIONS

PCT International Search Report for PCT/US2015/014462, Applicant: Intuit Inc., Form PCT/ISA/210 and 220, dated Nov. 30, 2015 (4pages).

(Continued)

*Primary Examiner* — Stephen Hong
*Assistant Examiner* — Gregory Vaughn
(74) *Attorney, Agent, or Firm* — Vista IP Law Group LLP

(57) ABSTRACT

Methods, systems and articles of manufacture for creating an electronic spreadsheet using a web-based spreadsheet application. A web-server hosting a web-based spreadsheet website comprises one or more computer(s) having at least one computer processor, memory, data storage and a network communication device (e.g. a network adapter). The web-server is configured to transmit a spreadsheet web application to a user computing device (e.g. a personal computer, smartphone, etc.) having a web-browser via the internet. The spreadsheet web application is configured to program the web-browser of the computing device to display and execute a spreadsheet web application having various features and functionality, including one or more of a separate design section and preview panel, a test data feature, line by line building of a spreadsheet without a starting grid of rows and columns, an embedded spreadsheet feature, an embedded worksheet display within a line feature, or any combination of these features.

26 Claims, 18 Drawing Sheets

(56) References Cited

U.S. PATENT DOCUMENTS

| | | | |
|---|---|---|---|
| 2002/0129054 A1* | 9/2002 | Ferguson | H04L 29/06 715/212 |
| 2006/0026240 A1* | 2/2006 | Anthony | G06Q 30/02 709/206 |
| 2007/0033074 A1* | 2/2007 | Nitzan | G06F 19/3437 705/3 |
| 2007/0233811 A1* | 10/2007 | Rochelle | G06F 17/246 709/219 |
| 2008/0071580 A1* | 3/2008 | Marcus | G06F 19/3456 705/3 |
| 2013/0085962 A1* | 4/2013 | Duncanson | G06Q 10/10 705/348 |
| 2013/0145244 A1 | 6/2013 | Rothschiller et al. | |
| 2013/0254270 A1 | 9/2013 | Rochelle et al. | |

OTHER PUBLICATIONS

PCT Written Opinion of the International Search Authority for PCT/US2015/014462, Applicant: Intuit Inc.,, Form PCT/ISA/237, dated Nov. 30, 2015 (8pages).

http://en.wikipedia.org/wiki/List_of_spreadsheet_software, printed Feb. 4, 2015 (4 pages).

http://www.google.com/sheets/about/, printed Feb. 4, 2015 (6 pages).

* cited by examiner

SYSTEMS, METHODS AND ARTICLES FOR A WEB-BASED SPREADSHEET APPLICATION

BACKGROUND

The invention relates to methods, systems and apparatus for a web-based (i.e., online) spreadsheet application, and more particularly, to new methods, systems and apparatus for a web-based spreadsheet program which allows for simplified creation, customization and data entry.

There are a number of computerized spreadsheet applications for the organization, analysis and storage of data in a tabular form, such as EXCEL™ from Microsoft, Inc., and NUMBERS™ for MAC™ from Apple, Inc. Generally, a computerized spreadsheet consists of a table of cells arranged into a two-dimensional array of rows and columns, in which each cell is configured to contain variable input data, constant data, formulas and/or functions. Typically, the rows are labeled using numbers, 1, 2, 3, etc. and the columns are labeled using letters, A, B, C, etc., such that a single cell can be referred to by addressing its row and column labels, for example, "C9", which refers to the cell located in the third column and the 9th row.

A user interacts with a spreadsheet mainly through the cells by selecting one or more cells of a displayed array of cells (e.g. an array of cells in 20 rows by 25 columns) and entering data, such as alphanumeric text, formulas, and/or functions into the cells. A spreadsheet may be created for a particular purpose, such as for accounting or bookkeeping task or other desired calculation or analysis, using certain cells for inputting variable data such that calculations can be conveniently performed on various different data sets. For instance, a cell might include text which is a heading or label, or a date. A formula usually begins with an equals sign, indicating that the value of the cell equals some the results of a formula (e.g. "=5*9").

One particularly powerful feature of computerized spreadsheets is the ability for formulas and functions to refer to the contents of other cells, which may in turn be the result of another formula and/or functions which may also refer to the contents of other cells. In order to reference a cell in a formula or function, the formula simply includes the cell reference, such as "=5*C9". This formula defines the value of the cell containing the formula as the result of multiplying the value in cell "C9" by the number 5. Many complicated data analyses, calculation and other problems can be broken down into a series of individual steps which can be assigned to individual cells having formulas. The formulas and functions may also apply to a range of cells, which may be defined by including each of the cell references, or by shorthand references such as "C1:C9" which refers to all of the cells in a column "C" from row 1 to row 9.

However, current computerized spreadsheet application require a user to learn and understand numerous commands, syntax, formulas and functions in order to create a spreadsheet. Also, it is difficult to know if the spreadsheet is being created correctly because the spreadsheet simply shows an array of cells in which some may display data, and the formulas and functions may not display at all because such cells are displaying the results of the formulas and functions rather than the formulas and functions themselves. In addition, a spreadsheet may be created for multiple users and/or for multiple data sets. For example, a spreadsheet may be created for data entry users to enter numerous different data sets into the spreadsheet and to obtain a resulting calculated spreadsheet for each data set. However, once the spreadsheet is created, it is often difficult to hand off the spreadsheet to others for entering input data because the data entry users can input data into the wrong cells and may inadvertently modify cells which should not be changed.

SUMMARY

Embodiments of the present invention are directed to methods, systems and articles of manufacture for creating an electronic spreadsheet using a web-based spreadsheet application. The spreadsheet is configured for inputting input data into the spreadsheet and performing one or more calculations using the input data.

In one embodiment, the invention is direct to a system for providing a web-based spreadsheet website accessible through the internet. The system is implemented on a web-server hosting a web-based spreadsheet website accessible through the internet. The web-server comprises one or more computer processors, memory, data storage, and a network adapter (an internet communication device) for providing access to the web-based spreadsheet website through the internet.

The web-based spreadsheet website is configured to transmit a spreadsheet web application to a user computing device via the internet. The user computing device may be any suitable computing device having a web browser and capable of connecting to the internet, such as a personal computer, a tablet computer, a cellular phone, a smart phone, a hand-held computer, or the like. The spreadsheet web application is in a web-browser programming language and is configured to program the web-browser of the computing device to display and execute the spreadsheet web application. The spreadsheet web application running on the web-browser is configured to display and execute a spreadsheet web interface having a design section having a plurality of user-selectable spreadsheet commands and functions for creating a spreadsheet. The web interface may also have a preview panel separate from the design section which displays a spreadsheet preview of a spreadsheet in an end-user mode as the spreadsheet is being created by the user in the design section.

In another aspect, the spreadsheet web application may be further configured to allow test data to be entered into the spreadsheet preview. The spreadsheet preview calculates the spreadsheet according to a design of a spreadsheet in the design section. In this way, the user can see how the spreadsheet looks and how it functions while creating the spreadsheet.

In still another aspect, the spreadsheet web application may be configured to create a spreadsheet in a line by line sequence without a starting grid of rows and columns. The rows and/or columns of the spreadsheet are formed only as the rows and/or columns are added to the spreadsheet by the user in the design section. For example, the user may select a command to add a row to the spreadsheet, and only then is the row added to the spreadsheet.

As another feature, the spreadsheet web application may be configured with an embedded worksheet function to embed a worksheet within a particular line (or cell) of a main spreadsheet, called a first or referencing spreadsheet. The embedded worksheet function creates an embedded worksheet comprising a different spreadsheet, called a referenced spreadsheet, in which a value of the referenced worksheet is used by the particular line in executing the referencing spreadsheet. The spreadsheet web application may also be configured to recursively embed referenced spreadsheets.

In another innovative aspect, the spreadsheet web application may be configured to display the embedded worksheet in the particular line of the referencing spreadsheet which references the embedded worksheet.

The web-based spreadsheet website may be further configured to facilitate use of a spreadsheet created using the spreadsheet web application by one or more end-users. The website is configured to receive from the user a spreadsheet created using the spreadsheet web application, via the internet. The website then generates an end-user spreadsheet application of the spreadsheet. The end-user spreadsheet application is configured to display and execute the spreadsheet with one or more fields of the first spreadsheet locked from being modified by the end-user, and one or more fields which allow the user to enter end-user data. The website is also configured to transmit the end-user spreadsheet application to a web-browser of an end-user computing device.

Another embodiment of the present invention is directed to a system for executing the spreadsheet web application. The system comprises a computing device (e.g. a personal computer, tablet computer, smartphone, etc.) having a computer processor, memory, data storage and a network communication adapter capable of accessing the internet. The computing device further comprises a web-browser and a spreadsheet web application in a web-browser programming language which is programs the web-browser to execute the spreadsheet we application. The spreadsheet web application is configured to display and execute a web spreadsheet interface comprising a design section having plurality of user-selectable commands and functions for creating a spreadsheet. In addition, the spreadsheet web application comprises one or more of the additional features as described above for the web-server based system. For example, the spreadsheet web application may include the separate preview panel, the test data feature, the line by line building of a spreadsheet without a starting grid of rows and columns, the embedded spreadsheet feature, the embedded worksheet display within a line feature, or any combination of two or more of the additional features.

Another embodiment of the present invention is directed to computer-implemented methods for creating an electronic spreadsheet using a web-based spreadsheet application. For instance, the method may include a web-server hosting a web-based spreadsheet website, same or similar to the system described above, transmitting a spreadsheet web application to a user computing device via the internet. The spreadsheet web application is in a web-browser programming language and is configured to program a web-browser of the computing device to display and execute the spreadsheet web application. The spreadsheet web application is configured to display and execute a spreadsheet web interface having a design section having a plurality of user-selectable spreadsheet commands and functions for creating a spreadsheet. The spreadsheet application is also configured to include one or more of the additional features as described above for the web-server based system and computing device system, including the separate preview panel, the test data feature, the line by line building of a spreadsheet without a starting grid of rows and columns, the embedded spreadsheet feature, the embedded worksheet display within a line feature, or any combination of two or more of the additional features.

In another aspect of the methods, the web interface may also have a preview panel separate from the design section which displays a spreadsheet preview of a spreadsheet in an end-user mode as the spreadsheet is being created by the user in the design section.

Another embodiment of the present invention is directed to an article of manufacture comprising a non-transitory computer readable medium embodying instructions executable by a computer to execute a process according to any of the method embodiments of the present invention for creating an electronic spreadsheet using a web-based spreadsheet application. For example, the non-transitory computer readable medium embodying instructions executable by a computer may be configured to execute a process comprising: transmitting a spreadsheet web application to a web-browser of a user computing device via the internet, the spreadsheet web application in a web-browser programming language for programming the web-browser to execute the spreadsheet web application, the web-server comprising one or more computer processors, memory and data storage and hosting a web-based spreadsheet website; and wherein the spreadsheet web application is configured to display and execute on the user computing device a spreadsheet web interface comprising a design section having a plurality of user-selectable spreadsheet commands and functions for creating a spreadsheet. Similar to the methods of the present invention, the spreadsheet web application is configured to include one or more of the additional features as described above for the web-server based system and computing device system, including the separate preview panel, the test data feature, the line by line building of a spreadsheet without a starting grid of rows and columns, the embedded spreadsheet feature, the embedded worksheet display within a line feature, or any combination of two or more of the additional features.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION OF ILLUSTRATED EMBODIMENTS

Embodiments of the present invention are directed to methods, systems and articles of manufacture for creating an electronic spreadsheet using a web-based spreadsheet application. Generally, a web-server hosting a web-based spreadsheet website comprises one or more computer(s) having at least one computer processor, memory, data storage and a network communication device (e.g. a network adapter). The web-server is configured to transmit a spreadsheet web application to a user computing device (e.g. a personal computer, tablet computer, smartphone, etc.) having a web-browser via the internet. The spreadsheet web application is configured to program the web-browser of the computing device to display and execute a spreadsheet web application having various features and functionality, including one or more of a separate design section and preview panel, a test data feature, line by line building of a spreadsheet without a starting grid of rows and columns, an embedded spreadsheet feature, an embedded worksheet display within a line feature, or any combination of these features.

Figure 1:
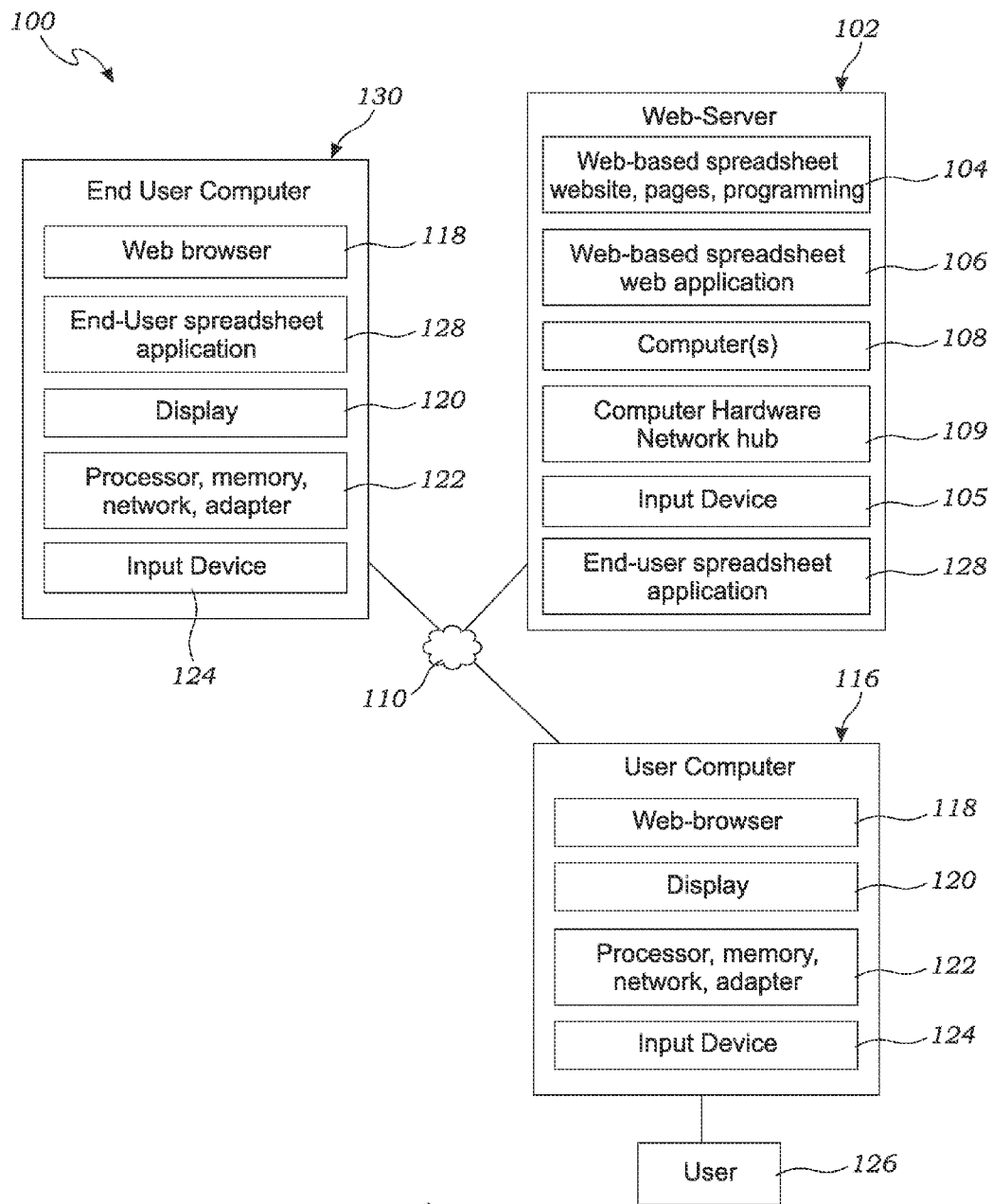
FIG. 1 illustrates a block diagram of an exemplary system for creating an electronic spreadsheet using a web-based spreadsheet application, according to one embodiment of the present invention.

Referring to FIG. 1, in one embodiment, a block diagram of a web-based spreadsheet system 100 for creating an electronic spreadsheet using a web-based spreadsheet application is shown. The system 100 comprises a web-server 102 hosting a web-based spreadsheet website 104 which is accessible by a user computer 116 via the internet 110. The web-based spreadsheet website 104 comprises web pages and software programming for providing a web-based spreadsheet website. For example, the web-based spreadsheet website may include a welcome page, log-in functionality for accessing the website, and other website content.

The web-server 102 also comprises one or more computer(s) 108 having one or more computer processor(s), and computer hardware 109, such as memory, data storage and networking hub and/or network adapters for communicating with a user computer 116 via the internet 110.

The web-server 102 also comprises a web-based spreadsheet web application 106 which is in a web-browser programming language. The web-browser programming language may be any suitable programming language, or combination of programming languages, such as JAVA, JAVASCRIPT, HTML or other scripting language for a web-browser. The web-based spreadsheet web application 106 is configured to program a web-browser 118 of the user computer 116 to execute and display the spreadsheet web application 106 on the user computer 116.

The user computer 116 may be any type of computing device having a computer processor, memory, a network adapter for communicating over a communication network including the internet (collectively, computer hardware 122), a display 120 for displaying graphics (e.g. an LCD display, LED display, CRT display, etc.) and an input device 124 (e.g. a mouse, touchpad, touchscreen, keyboard, etc). For example, the user computer 116 may be a personal computer, a tablet computer, a cellular phone, a smartphone, a handheld computer, or the like. The user computer 116 also has a web-browser 118 for browsing the internet and executing web applications configured for operating on a web-browser. The network adapter may be any suitable network adapter for providing a connection to the internet, such as an ethernet adapter, WiFi adapter, Bluetooth adapter, cellular data transceiver (sometimes called a cellular transceiver chip), etc.

Figure 2:
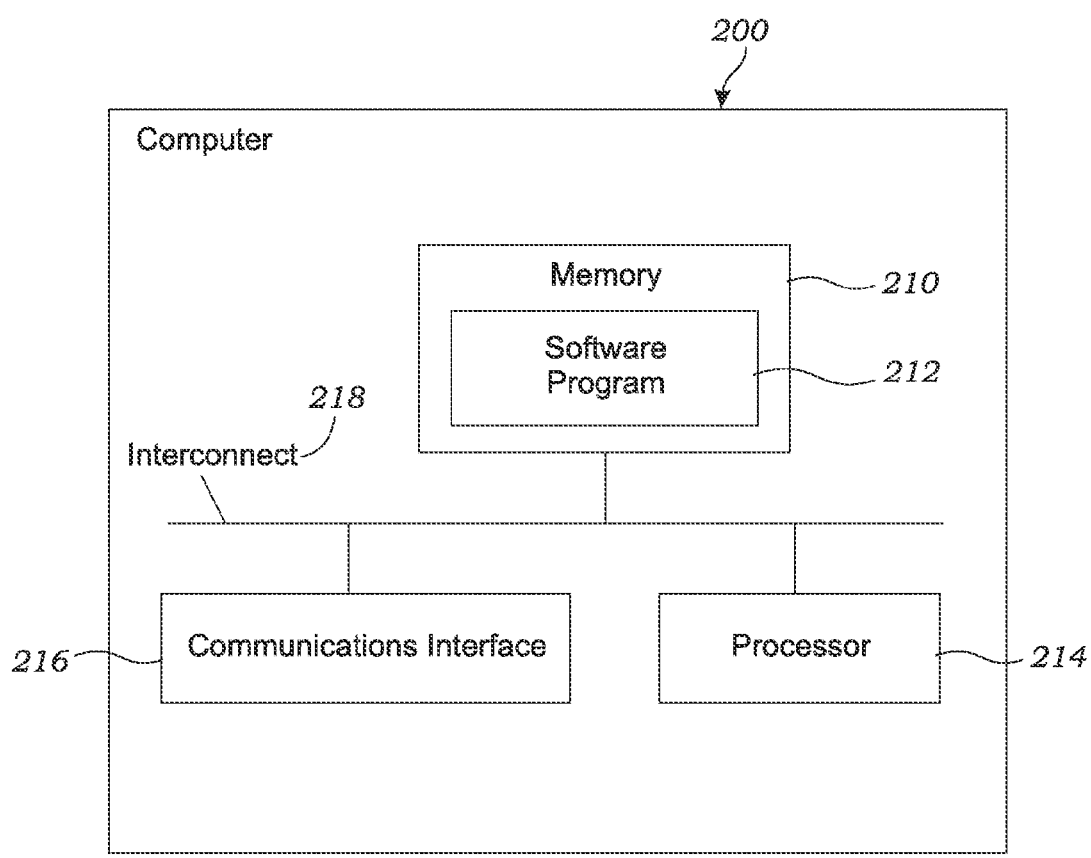
FIG. 2 is a block diagram of a computing device (computer) which may be utilized in the system of FIG. 1.

FIG. 2 generally shows a block diagram of the components of an example of a computer (computing device) 200 that may be used as the computer in the computers and servers identified in the system 100 of FIG. 1, such as the computer(s) 108 of the web-server 102 and user computer 116. The computer 200 includes a memory 210, a software program(s) 212, a processor or controller 214 to execute the software program(s) 212, a network or communications interface 216, e.g., for communications with a network or interconnect 218 between the components. The memory 210 may be or include one or more of cache, RAM, ROM, SRAM, DRAM, RDRAM, EEPROM, SDRAM and other types of volatile or non-volatile memory capable of storing data. The processor unit 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computer 200 may be located remotely and accessed via a network. Accordingly, the system configuration provided in FIG. 2 is provided to generally illustrate how embodiments may be configured and implemented.

The web-server 102 is networked to the internet 110, and is in communication with the user computer 116 through the internet 110 and/or any other communication networks, such as a proprietary network, LAN, WAN, cellular network, wireless network, the internet and/or other suitable communication network.

In operation, the user 126 accesses the web-based spreadsheet website 104 using the web-browser 118 on the user computer 116, such as by entering the web address of the website 104 or using a search engine. Typically, the website 104 will display on the user computer a selection for the user to utilize the web-based spreadsheet web application 106. For instance, the website 104 may request the user 126 to log-in on the website 104. The user 126 logs in and selects to utilize the web-based spreadsheet web application 106. The web-server 102 receives the request from the user 126 to utilize the web-based spreadsheet application 106, and then transmits the web-based spreadsheet application 106 to the user computer 126 via the internet.

The web-based spreadsheet application 106 programs the web-browser 118 on the user computer 116 to execute and display the web-based spreadsheet application 106 on the display 120 of the user computer 116. The web-based spreadsheet application 106 can be transmitted completely to provide the full functionality of the web app, as described below, or it can be transmitted partially and intermittently as programming of the web-browser 118 is required by the spreadsheet web application 106 executing on the user computer, such as when functionality is selected by the user 126.

Figure 3:
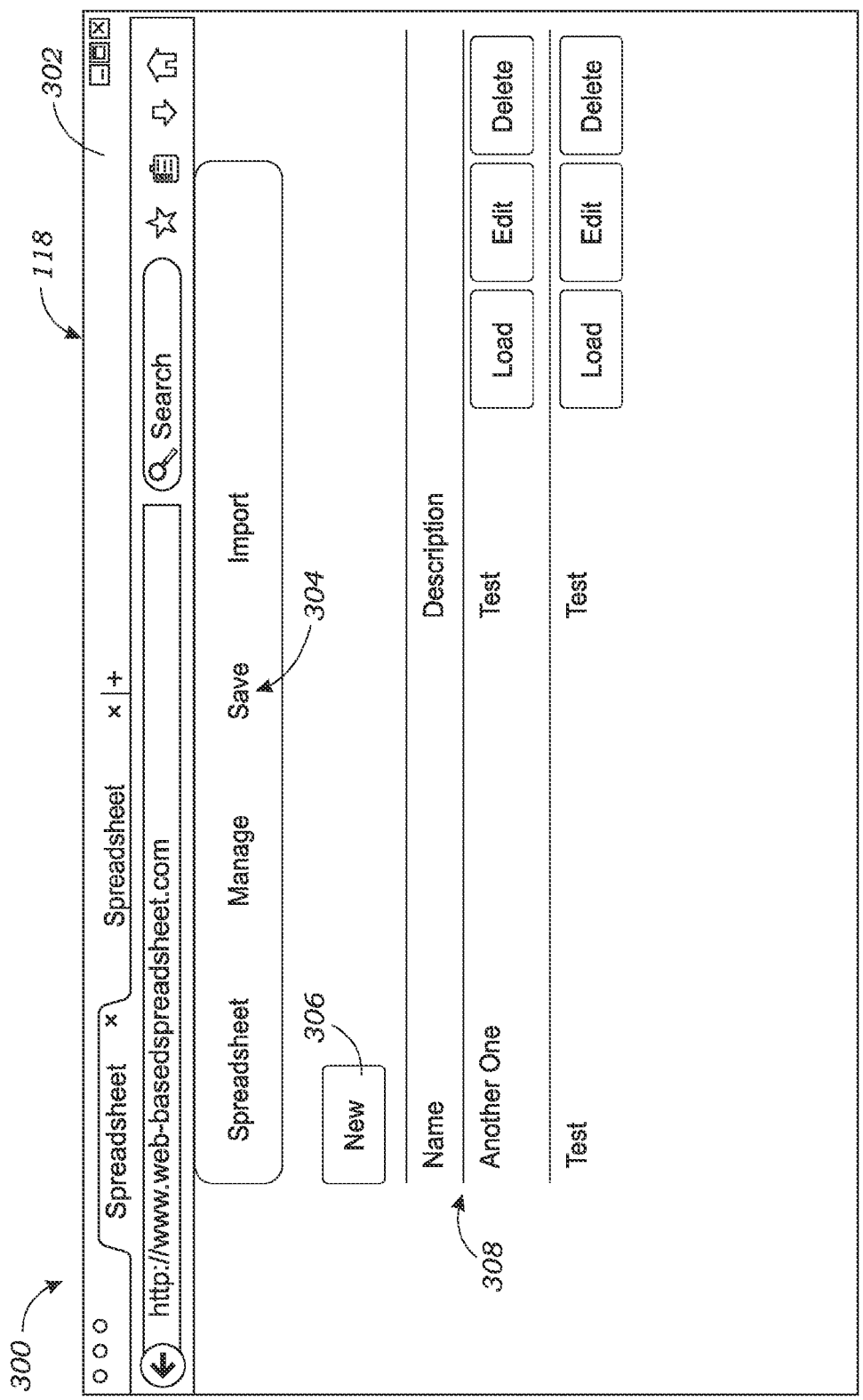
FIGS. 3-18 are various screen shots from a spreadsheet web application, according to one embodiment of the present invention.

Turning to FIGS. 3-19, a number of examples of screen shots of a representative spreadsheet web application 106 which are displayed on the display 120 of the user computer 116 as the spreadsheet web application 106 is executed within the web-browser 118. Referring first to FIG. 3, the screen shot 300 shows the web-browser 118 as displayed on the display 120. The web-browser 118 may be any suitable web-browser, such as INTERNET EXPLORER™ from Microsoft, Inc. or CHROME™ from Google, Inc., or FIREFOX™ from Mozilla, Inc. The web-browser 118 has a menu bar 302 having the typical menu items and functions, such as a back button, favorites button, home button, search bar, address bar, etc.

As shown in FIG. 3, the spreadsheet web application 106 first programs the web-browser 118 to display an "open spreadsheet" screen 300 which includes a command menu bar 304 having a plurality of commands, such as "Manage," "Save," and "Import." The commands and selections displayed by the web application 106 may be buttons, selectable text, menus, drop-down menus, or the like. Selection of the "Manage" command brings up the screen to manage the user's spreadsheets, same or similar to the screen 300. Selection of the "Save" command saves the current spreadsheet in the state at the time of the "Save" command. The "Save" command may save the spreadsheet on the user computer 116, on the web-server 102, or both. The "Import" command allows the user 126 to import a spreadsheet from a storage device, such as the storage device of the user computer 116 or another source, such as another computer, a cloud storage source, another user's account on the website 104, etc.

Screen 300 also displays a list 308 of previously created and stored spreadsheets. The list 308 may include the name and description of each spreadsheet, and also commands to "Load," "Edit," and "Delete" each of the spreadsheets in the list 308. The "Load" selection loads the selected spreadsheet for use of the spreadsheet without the ability to edit the spreadsheet. The "Edit" selection loads the selected spreadsheet and allows editing of the spreadsheet, which is the same as editing a new spreadsheet as described in detail below. The "Delete" selection deletes the selected spreadsheet from the list and may also delete the spreadsheet from where it is stored (e.g. user computer 116 or web-server 102).

Figure 4:
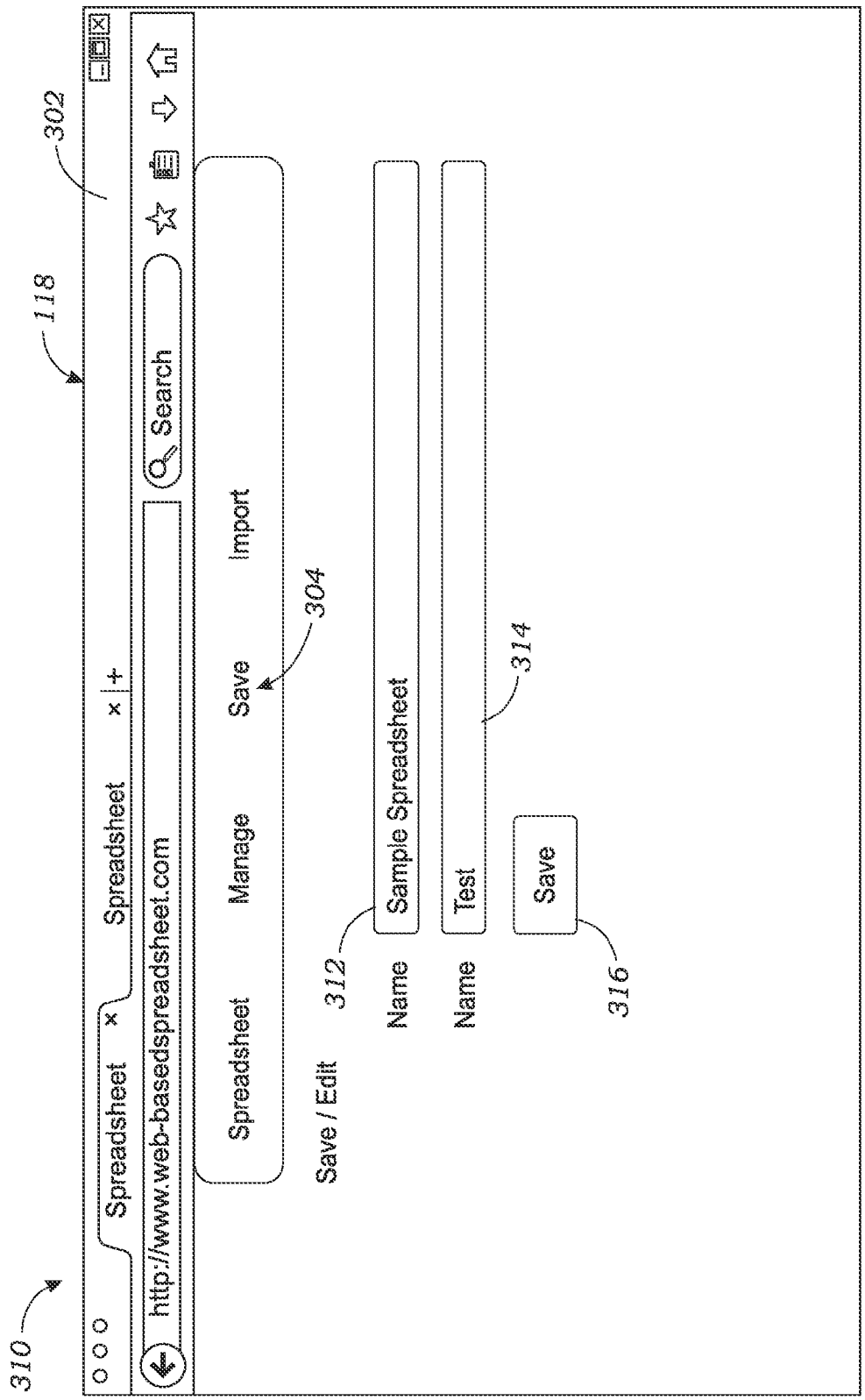

Screen 300 also has a "New" command 306 for opening and creating a new spreadsheet. Upon selection of the "New" command 306, the web application 106 opens a "new spreadsheet" screen 310, as shown in FIG. 4. The screen 310 includes a fill-able "Name" text box 312 and a fill-able "Description" text box 314, in which the user 126 can type in a name and description for a new spreadsheet using the input device 124 of the user computer 116. In this example, the user 126 has entered "Sample Spreadsheet" in the "Name" text box 312 and "Test" as the description in the "Description" text box 314. The screen 310 also has a "Save/Edit" command for saving the new spreadsheet having the name and description as entered into the respective text boxes 312 and 314, and proceeding to creating and editing the new spreadsheet. In all instances where it is described that data is entered or a command, function or other selection is selected in the web application 106, the web application 106 receives the data or the command, function or other selection. Accordingly, the act of the web application 106 receiving the data, command, function or other selection is not repeated throughout, with the understanding that such act is still described herein, and is a part of the described embodiments. Also, any "text box" may used for alpha-numeric text, numbers, text, punctuation and/or other characters, as the case may be for the particular "text box."

Figure 5:
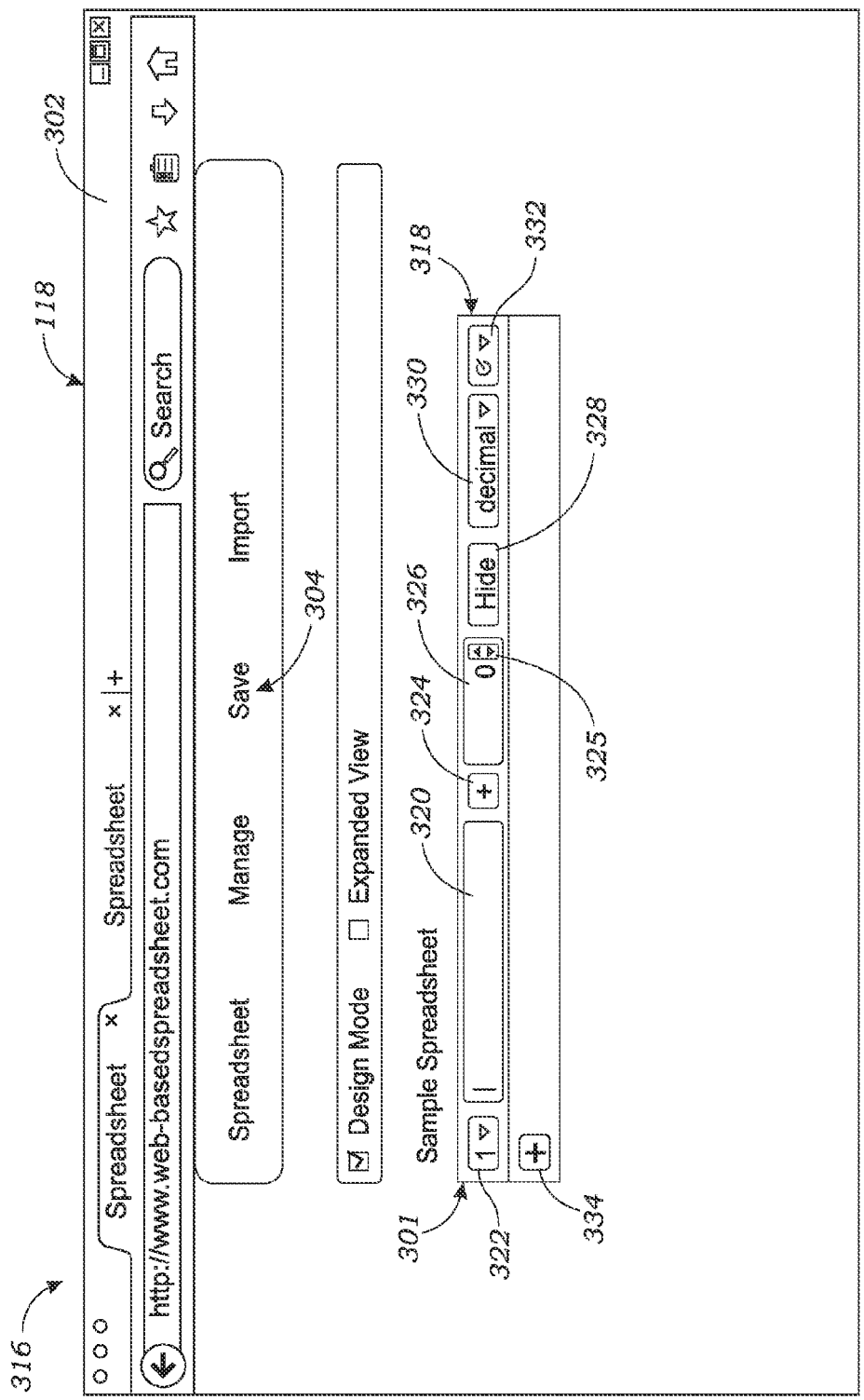

Turning to FIG. 5, upon selection of the "Save/Edit" command on screen 310, the web application 106 displays a spreadsheet building screen 316. In contrast to other electronic spreadsheet programs, the spreadsheet building screen 316 does not have a starting grid of rows and columns. Instead, the spreadsheet building screen 316 creates a spreadsheet in a line by line sequence. As shown in the screen shot 316 of FIG. 5, a first line 318 (a blank line until filled-in) for a spreadsheet 301 is displayed. The first line 318 includes a fill-able line description text box 320, a spreadsheet line number 322 (in this case, line number 1), a function selection 324, a line value box 326, a "Hide" command 328, a line value format selection 330, and a function editing menu 332. The building screen 316 also has an add line command 334 which when selected adds another line to the spreadsheet 301 (e.g. see FIG. 6 in which rows 2 and 3 have been added). The screen 316 also displays the name of the spreadsheet above the first blank line 318. The user 126 enters a line description into the line description text box 320 using the input device 124 of the user computer 106.

The user 126 may also select a function using the function selection 324, and upon selection of the function selection 324, a function drop-down menu 321 of selectable functions is displayed, such as mathematical functions, other function and/or commands. An example of the drop-down menu 321 is shown in the screen shot 317 of FIG. 6 for line 2 of the spreadsheet 301. To select one of the selectable functions in the dropdown menu 321, the user 126 simply moves a screen cursor onto, or scrolls onto the desired selectable function and clicks on the desired selectable function. The function selected in the function selection 324 defines a function to be applied between the preceding spreadsheet line 318 and the current spreadsheet line 318. For example, referring to FIG. 6, the "−" operator (subtraction function) selected in line 2 of the spreadsheet 301 indicates that calculation of the spreadsheet 301 will subtract the value of the line value box 326 in line 2 from the value of the line value box 326 in line 1.

The user 126 may enter a line value into the line value box 326 by typing a value into the box using an input device 124 of the user computer 116, or by using the selection arrows 325 to increase and decrease the line value. In creating the spreadsheet 301, a line value need not be entered into the line value box 326, and instead may enter values into the line value box 326 after the spreadsheet 301 is completed, and the spreadsheet 301 is being utilized for a desired calculation using particular input values for certain line value boxes 326.

Figure 7:
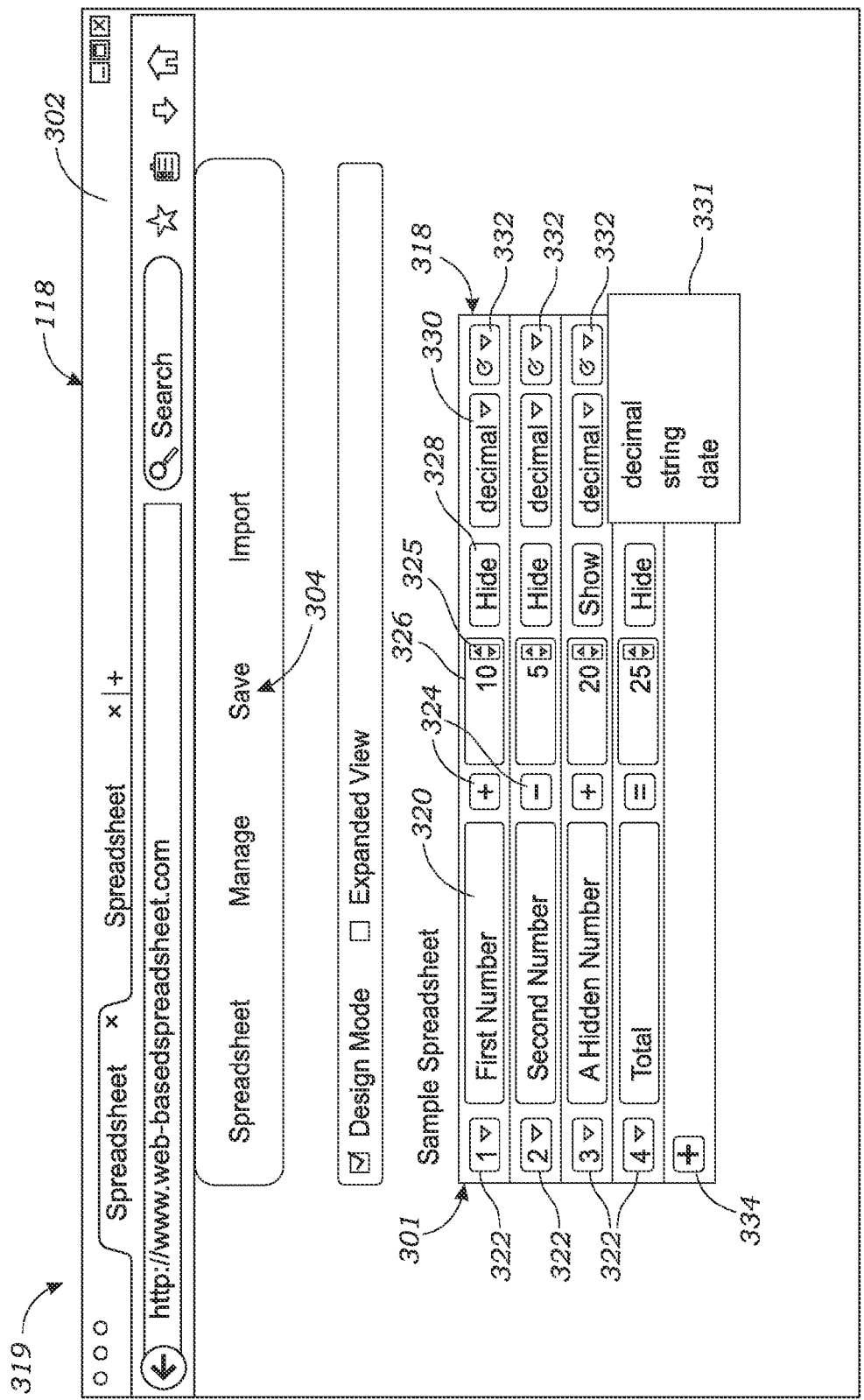

The line value format selection 330 is also a dropdown menu 331 of format selections for the type of value to be entered into the line value box 326, as shown in the screen shot 319 of FIG. 7 for line 3 of the spreadsheet 301. For example, the format dropdown menu may include format selections for decimal value, string value, and date, as well as currency values (e.g. $), time, percentage, fraction, text, etc. The format dropdown menu for the line value format selection 330 operates the same as the function dropdown menu 321, as do all of the other dropdown menus described herein.

The "Hide" command 328 is a toggle command which toggles between a "Hide" state which hides the selected line of the spreadsheet and a "Show" state in which the selected line is displayed. If the "Hide" command 318 shows the text "Hide", then selection of the command 318 hides the selected line, and the command 318 then toggles to display the text "Show" in the command button 318, as shown in the screen shot 337 of FIG. 12 in line 3 of the spreadsheet 301. Conversely, if the command 318 shows the text "Show", then selection of the command 318 shows the selected line and toggles the command 318 to show the text "Hide."

Figure 6:
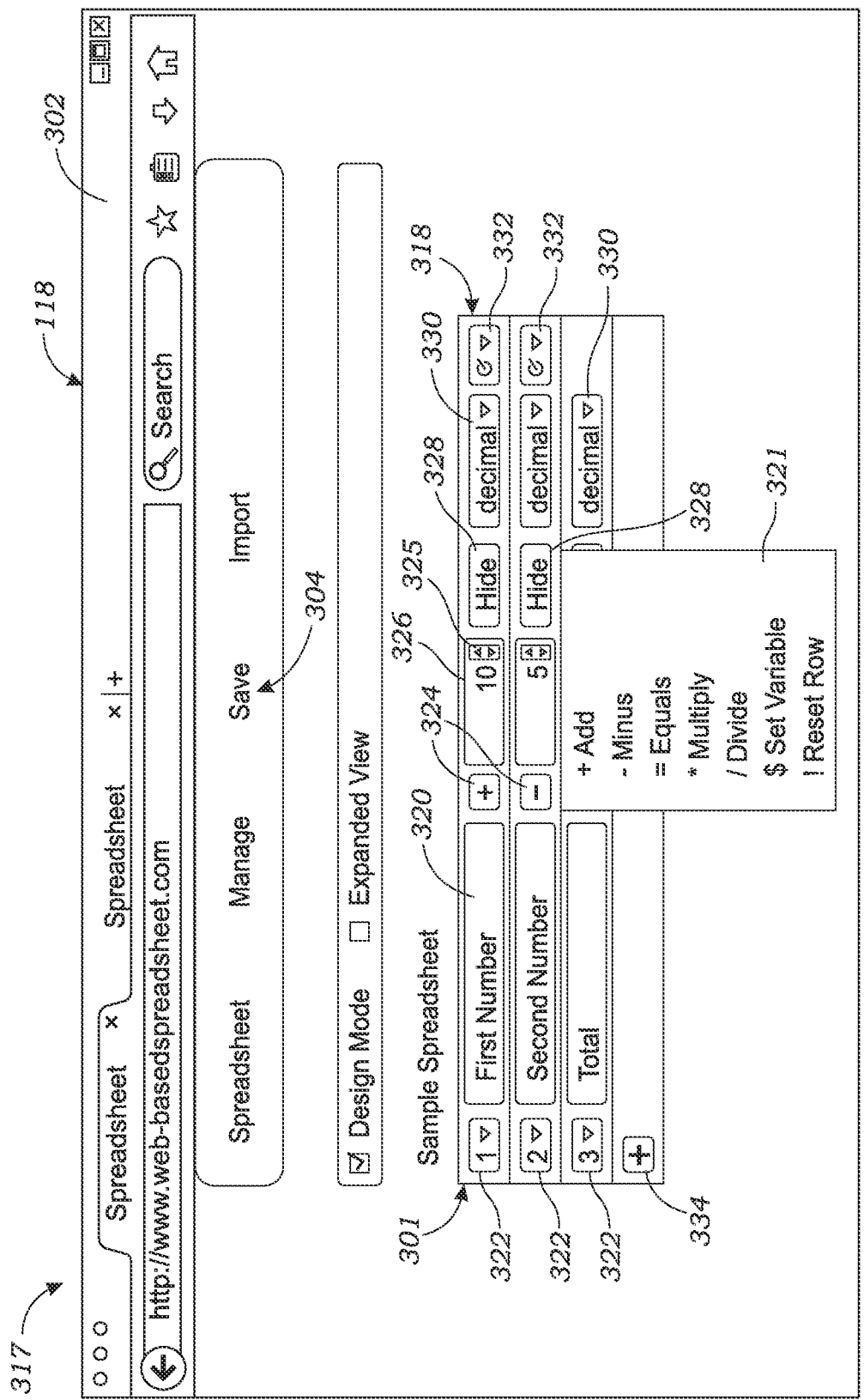

After the first line 318 has been entered, in order to create a second line in the spreadsheet 301 (spreadsheet line 2), the user 126 selects the add line command 334, and a second blank line the same as the first blank line shown in FIG. 5 is added below the first line 318, except that the second blank line has a "2" for the spreadsheet line number 322. FIG. 6 is a screen shot 317 showing a second line and third line added to the spreadsheet 301. The user 126 can then complete the second blank line in the same manner described above for the first line, as shown in FIG. 6. The add line command 334 may be selected to add as many lines as desired for the spreadsheet 301, with each additional line having the succeeding line number 322. An example of a spreadsheet 301 with three lines 318 completed is shown in FIG. 6.

Figure 8:
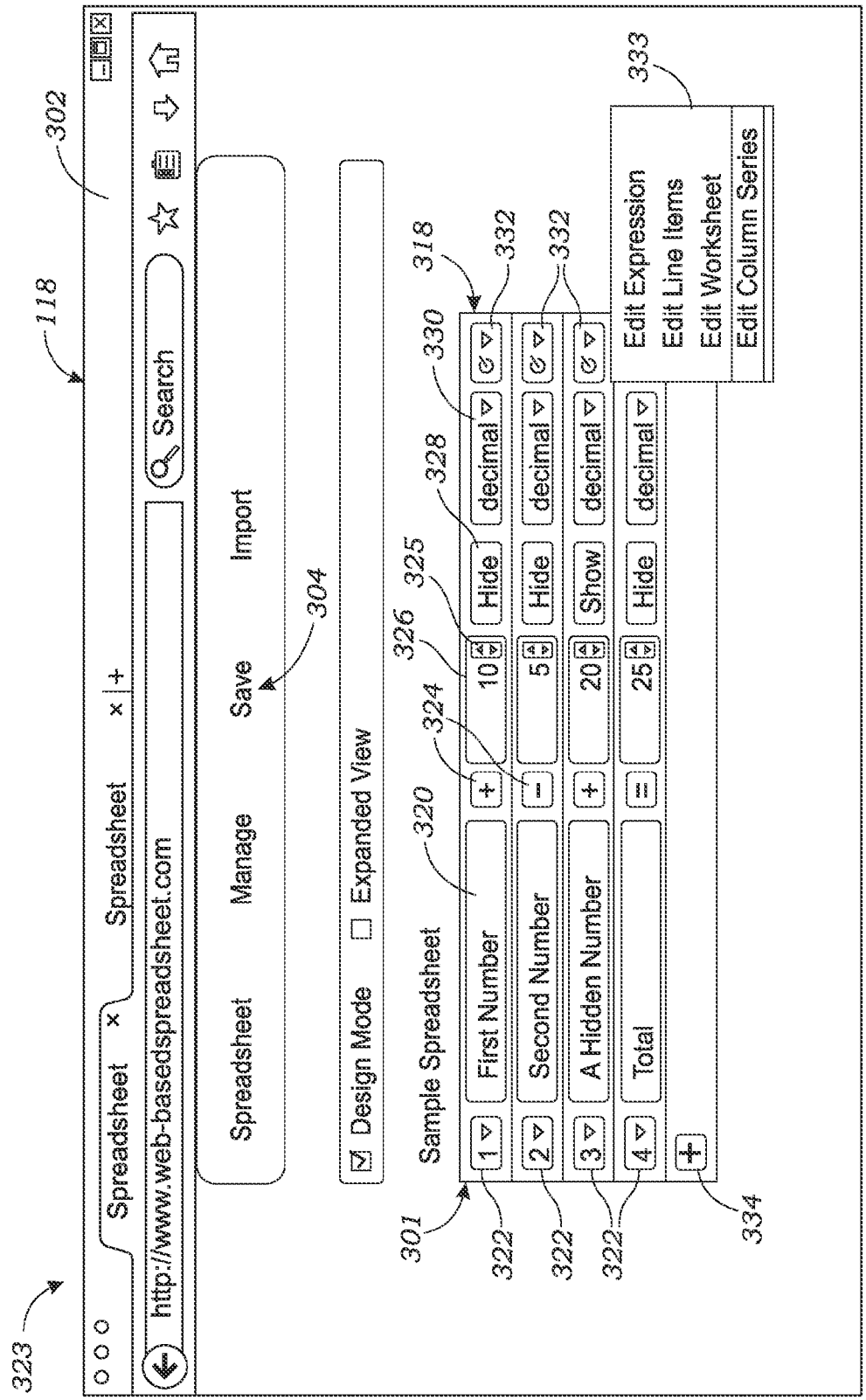
Figure 15:
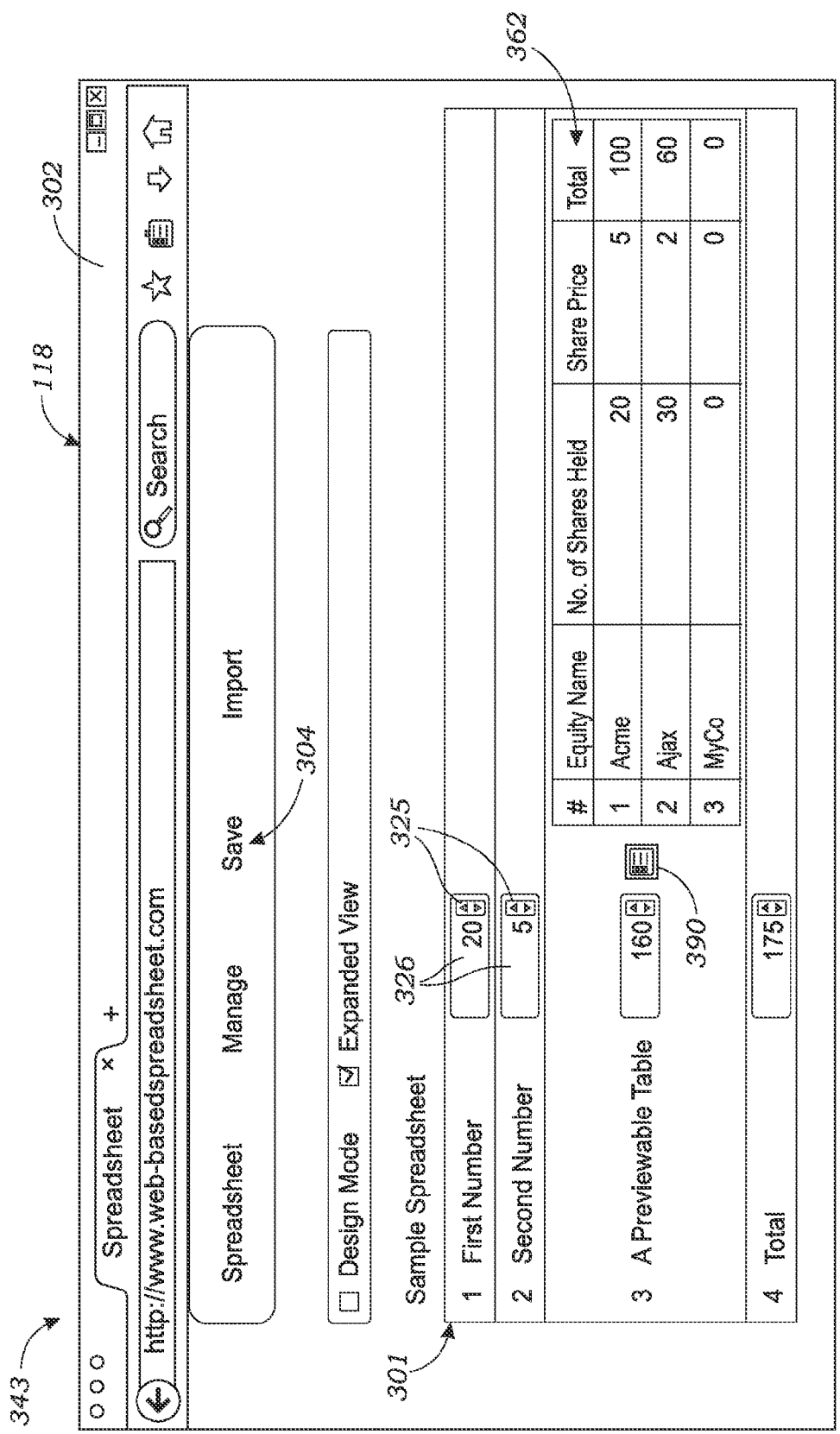

Turning to FIG. 8, the function editing menu 332 provides a selection of line functions for creating functions for the value of line value box 326 which are more complex than simply entering a value into the line value box 326. The editing menu 332 is also a dropdown menu 333, as shown in FIG. 8 in line 3 of the spreadsheet 301. The dropdown menu 333 includes the line functions "Edit Expression," "Edit Line Items," "Edit Worksheet," and "Edit Column Series." The "Edit Expression" function allows the user to enter an expression for the value of the line value box 326, which may have logic operators, mathematical functions and formulas, and/or references to other values in the spreadsheet or in a worksheet thereof. As a representative example using the spreadsheet 301 in its form as shown in FIG. 15, an expression may be "row.value=globals["My Embedded Calculation"][No. of Shares Held]." This expression sets the value of the line value box 326 for the particular row in which the expression is entered as the total of the No. of Shares Held column in the "My Embedded Calculation" worksheet 354.

Figure 9:
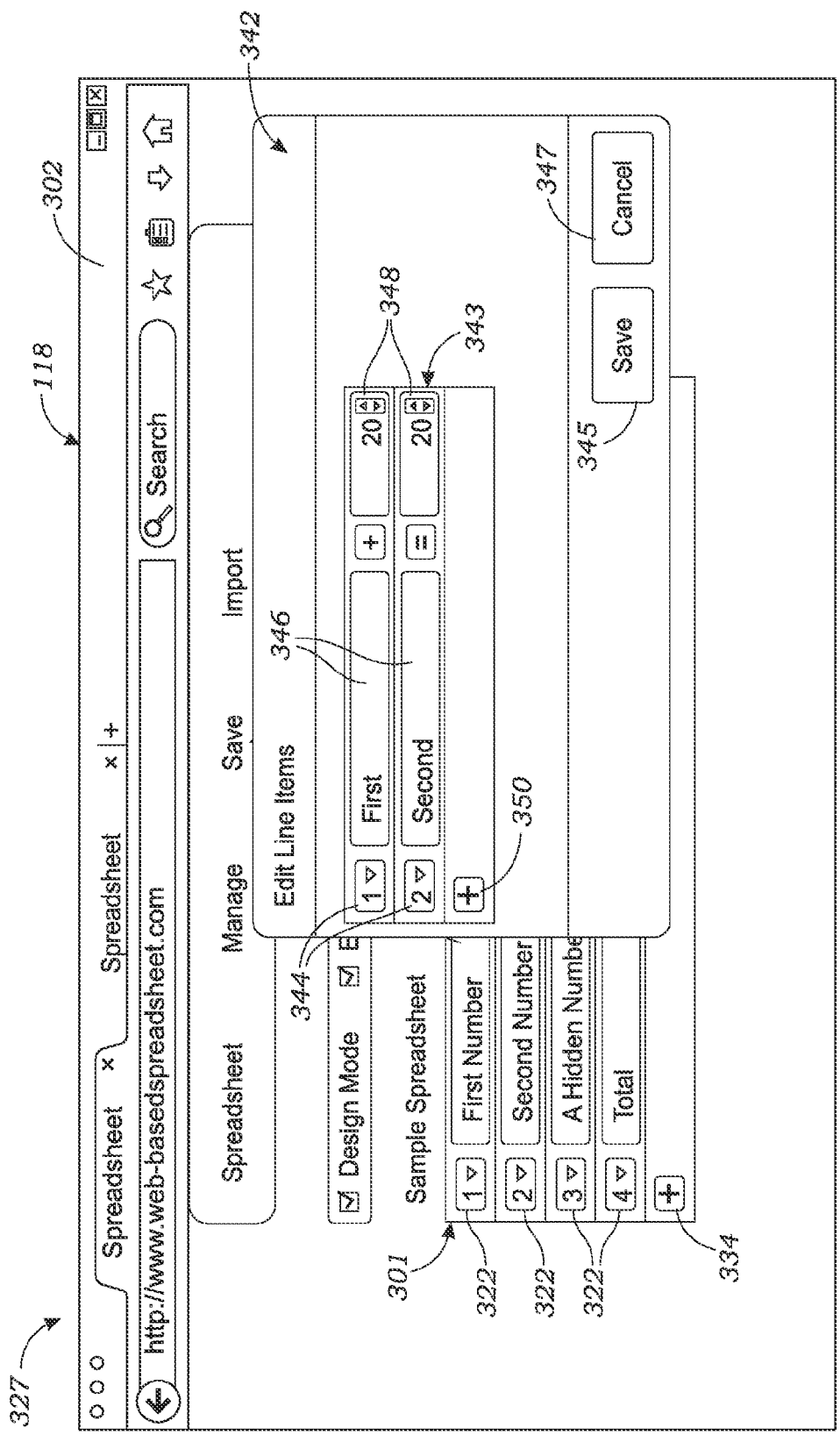

The "Edit Line Items" function of the function editing dropdown menu 333 allows a list of items having line item values which are added together to be entered for the value of the line value box 326. FIG. 9 shows a screen shot 327 of an "Edit Line Items" editing screen 342 which appears when the "Edit Line Items" function is selected from the function editing dropdown menu 333. This may be a pop-up screen which appears on top of the main screen 323 as shown in FIG. 8 (e.g. the main screen 323 may be faded or greyed out). The editing screen 342 allows one or more lines to be added to the "Line Items" function 343 for defining the value of the line value box 326 for the particular row (row 3 in the example of FIGS. 8 and 9) of the spreadsheet 301. The editing screen 342 displays a line number 344, an item description text box 346, and a line item value box 348 for each line of the "Line Items" function 343. The line item editing screen 342 has an add line item command 350 which when selected adds another line to the "Line Items" function 343. As with the add line command 334, the add line item command 348 can be selected to add as many line items as desired to the "Line Items" function 343. The editing screen 342 also has a "Save" button 345 for saving the "Line Items" function 343 as a part of the spreadsheet 301 of FIG. 8 and a "Cancel" button 347 to cancel the "Line Items" function such that the creation and/or any changes to the function 343 are not saved and do not become a part of the spreadsheet 301 of FIG. 8.

Figure 10:
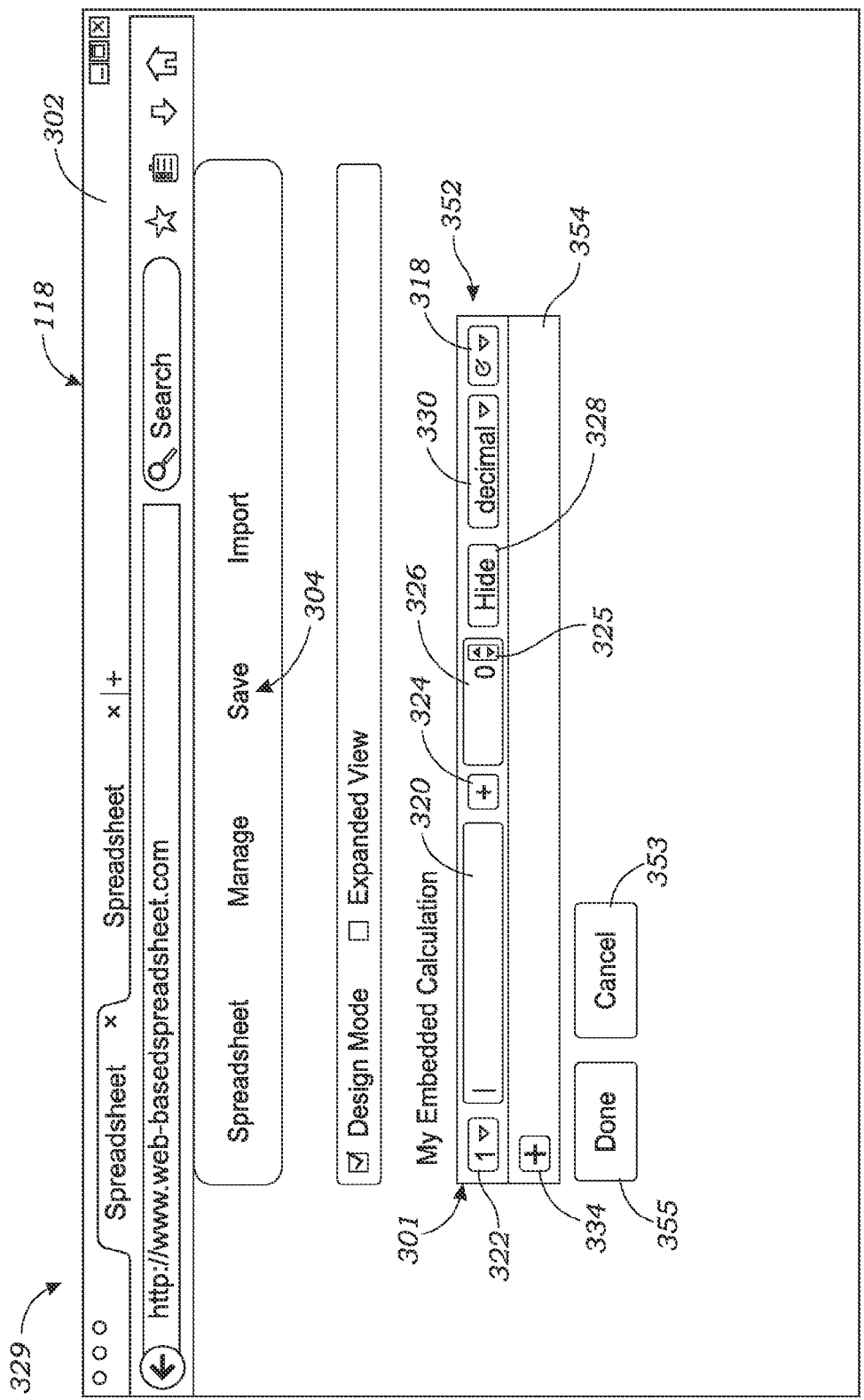
Figure 11:
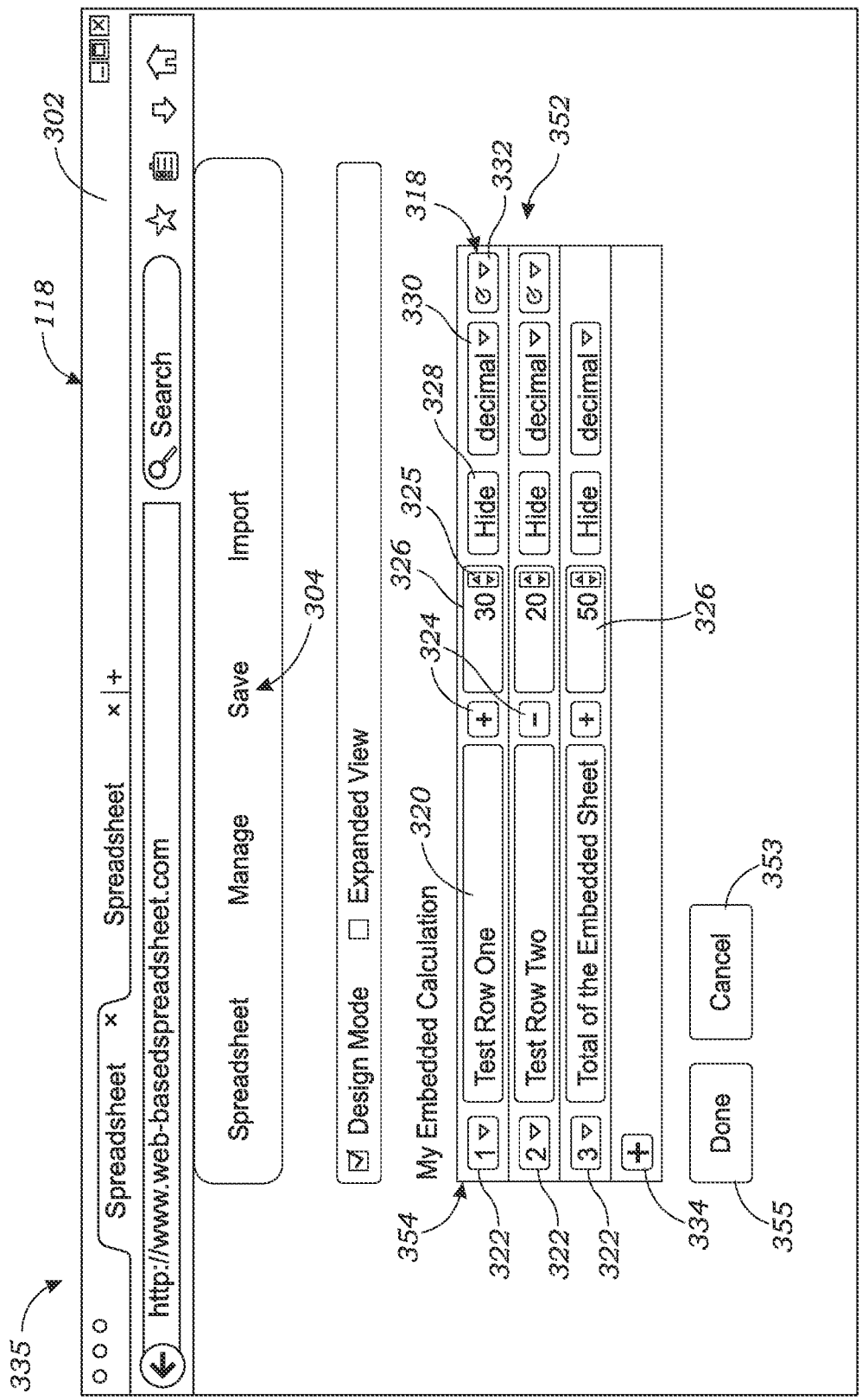
Figure 12:
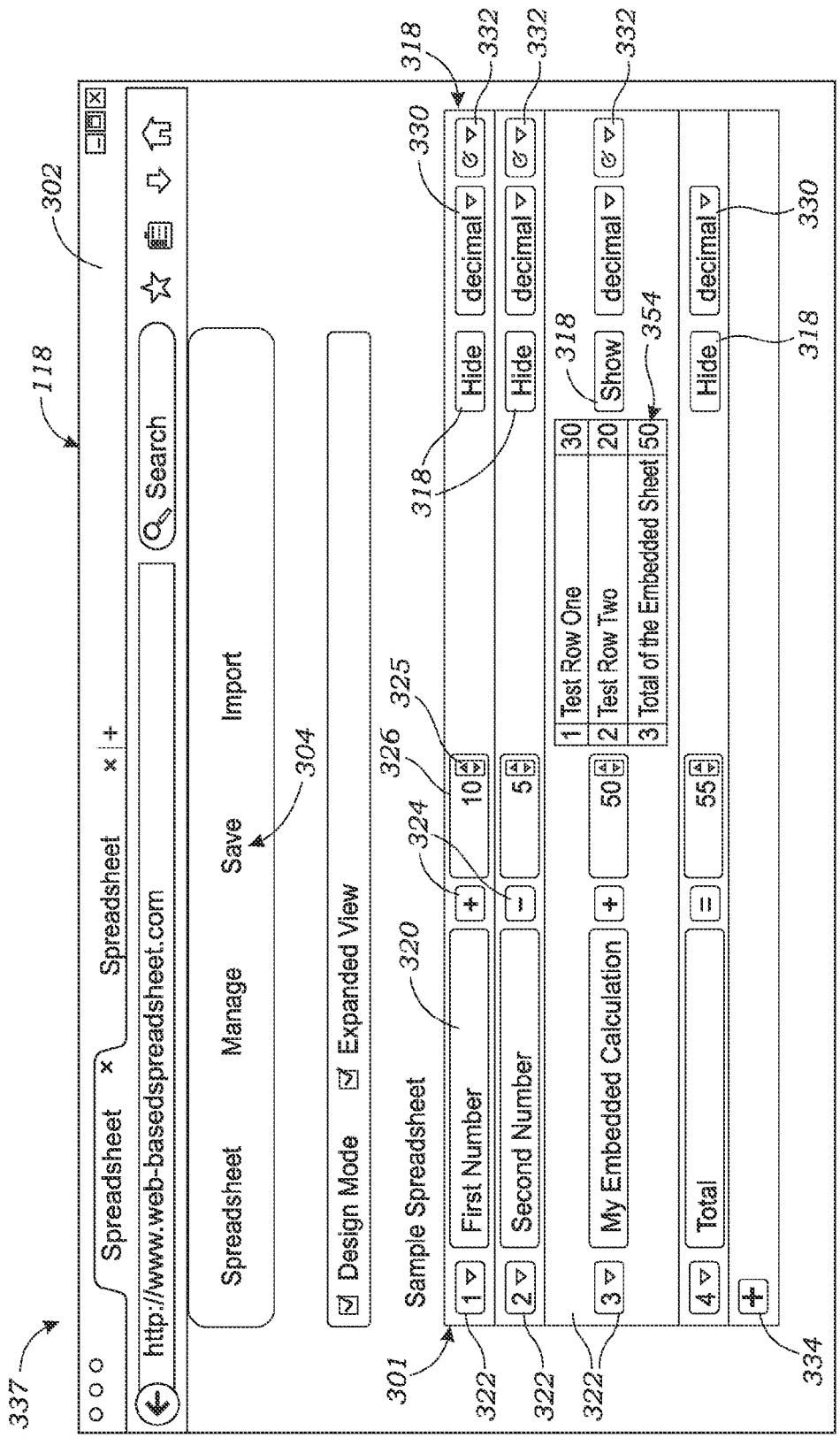

Selecting the "Edit Worksheet" function of the function editing dropdown menu 333 allows an embedded worksheet to be inserted into a line 318 of the spreadsheet 301 for defining the value of the line value box 326 of the particular line 318. Referring to FIG. 10, a screen shot 329 is shown which displays an embedded worksheet building screen 352 for creating an embedded worksheet 354 for line 3 of the spreadsheet 301 as shown in FIG. 11. The embedded worksheet building screen 352 has the same elements and functions, and operates the same, as the spreadsheet building screen 316 as described above, and like elements have like reference numbers. Thus, creating the lines 318 of an embedded worksheet 354 is created in the same way as described above for creating the lines 318 of the spreadsheet 301. FIG. 11 shows a screen shot 335 of an embedded worksheet 354 having three lines which have been created using the embedded worksheet function. The result of the embedded worksheet 354 defines the value entered into the line value box 326 for line 3 of the spreadsheet 301 in FIG. 11. The embedded worksheet building screen 352 has a "Done" button 355 which operates the same as the "Save" button 345 described above, and a "Cancel" button 353 which operates the same as the "Cancel" button 347 described above. Turning to FIG. 12, after selecting the "Done" button, the embedded worksheet 352 is inserted into the spreadsheet 301 in an Expanded View, as described below.

Figure 16:
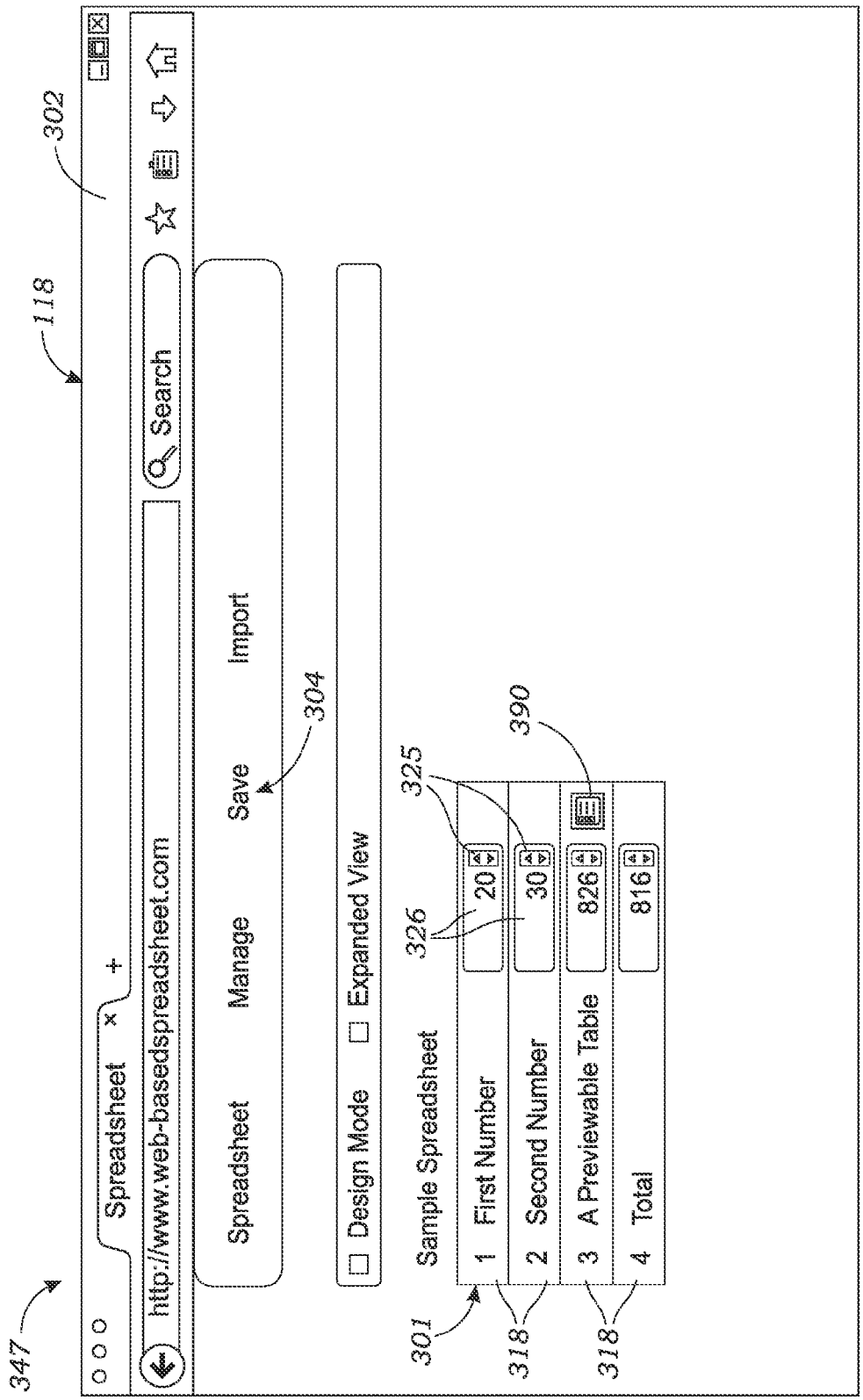
Figure 17:
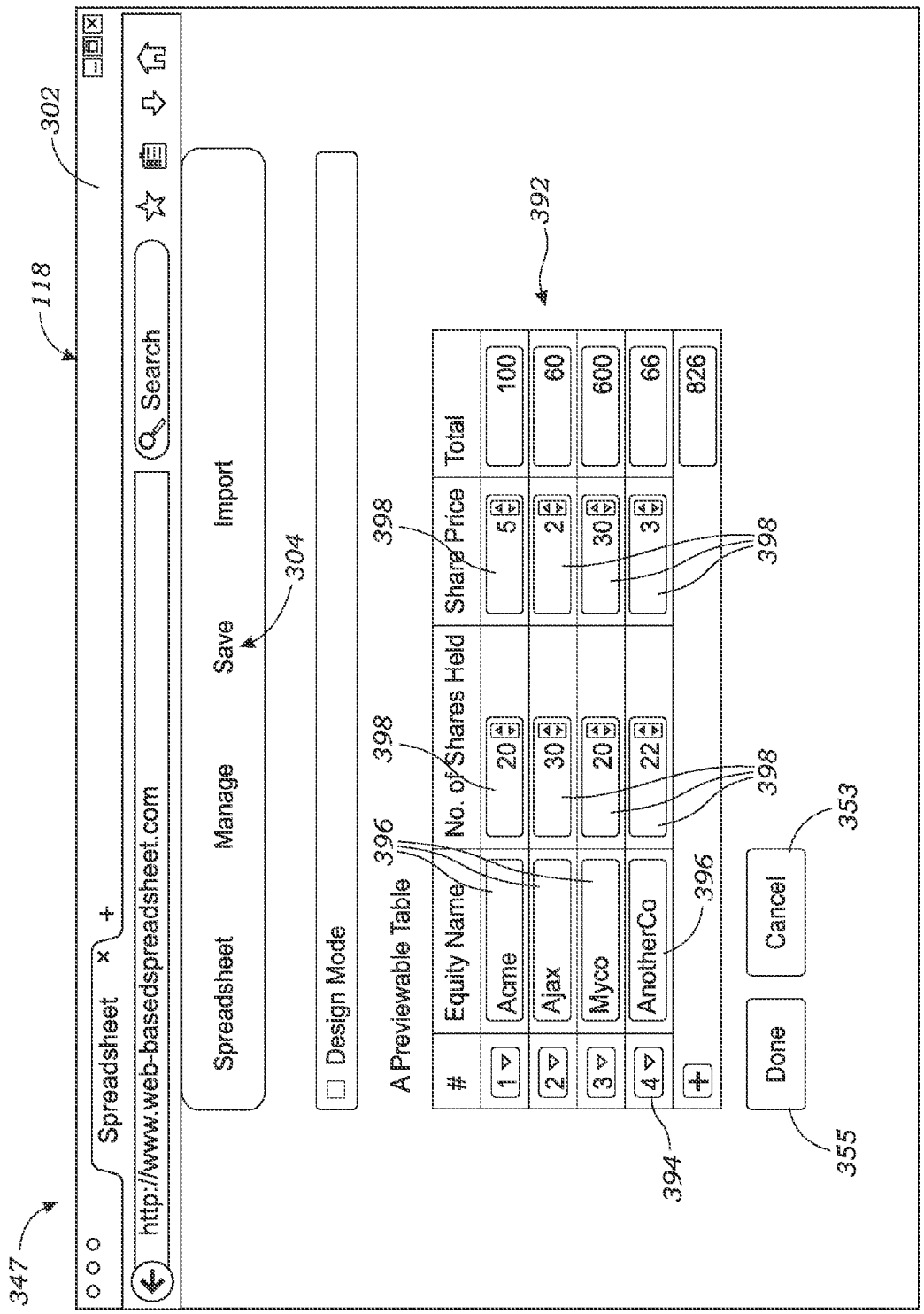
Figure 18:
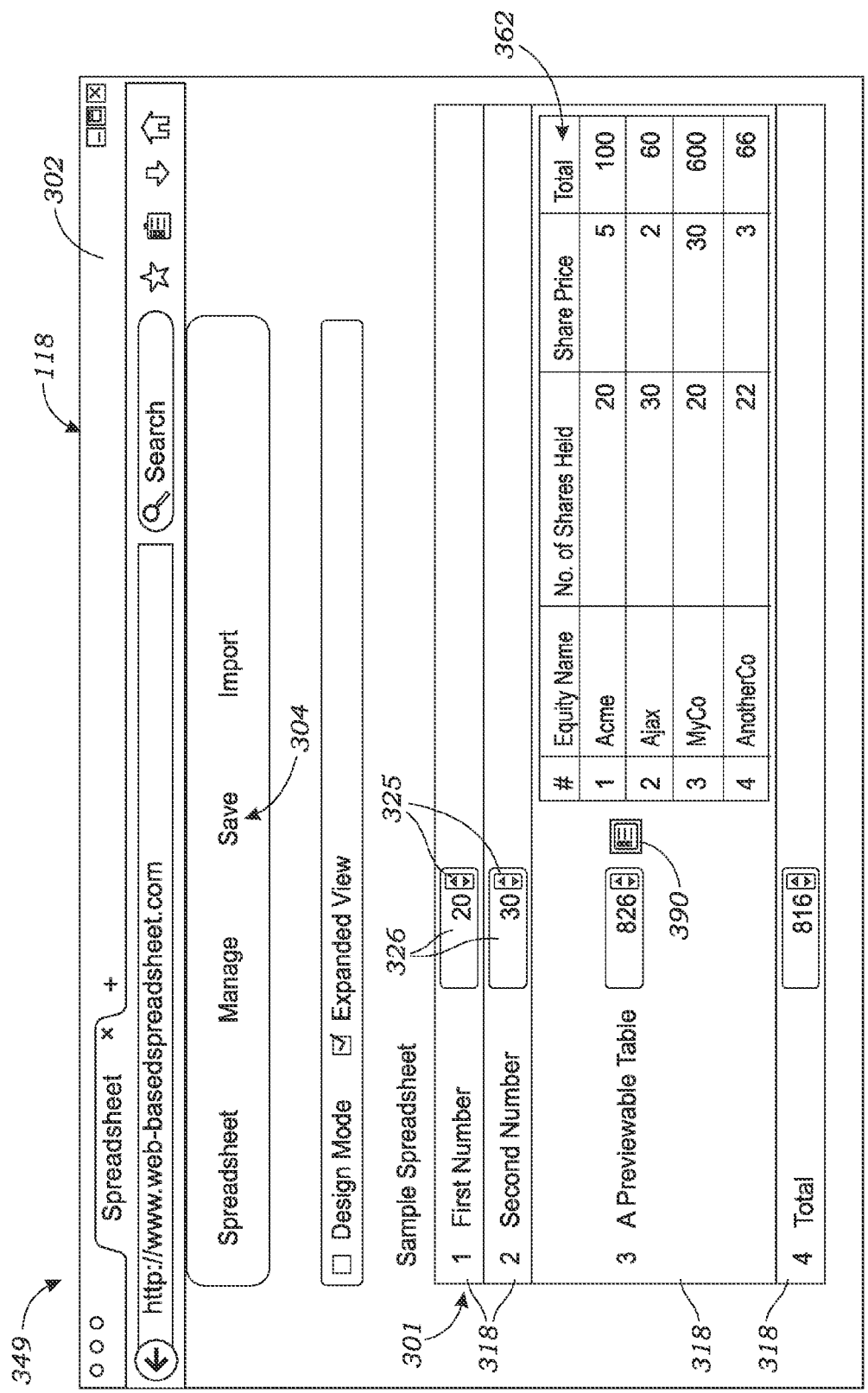

The spreadsheet web application 106 also displays a "Design Mode" selection in the form of a checkbox and an Expanded View selection also in the form of a checkbox. A user 126 can check or uncheck the checkbox of these selections to put the spreadsheet web application 106 into the Design Mode and out of the Design Mode (out of the Design Mode is referred to as a "User Mode" or "end-user mode"). In the Design Mode (i.e. with the checkbox checked), the application 106 displays the spreadsheet 301, or other spreadsheet functionality, in a mode in which the spreadsheet can be created and modified, and also shows any lines which are selected to be hidden. In the User-Mode (i.e. not in the design mode), the spreadsheet 301 cannot be modified, except that values can be entered into the line value boxes 324, and in some cases, additional lines can be added to a Line Item function, an Embedded Worksheet, or a Column Series function. As an example, FIG. 12 shows a spreadsheet 301 in the Design Mode, such that each line 318 includes the fill-able line description text box 320, the function selection 324, the line value box 326, the "Hide" command 328, the line value format selection 330, and the function editing menu 332. In contrast, FIGS. 15 and 16 show a similar spreadsheet 301 in the User Mode, in which the line description is not fill-able or changeable, and there is no fill-able line description text box 320, function selection 324, line value box 326, "Hide" command 328, line value format selection 330, or function editing menu 332. An end user can only fill certain line value boxes 326.

When the Expanded View selection is selected (i.e. the checkbox is checked), the spreadsheet 301 is displayed with any line functions created using the line functions from the function editing menu 332 inserted into the particular spreadsheet line, as shown in FIG. 12 in line 3. The spreadsheet 301 in FIG. 12 shows the embedded worksheet 354 inserted into line 3. Accordingly, the line value box 325 for line 3 will be the result of the embedded worksheet 354. When the Expanded View selection is de-selected (i.e. the checkbox is unchecked), the line functions are not displayed in the spreadsheet 301, as can be seen by comparing FIG. 15 (Expanded View) and FIG. 16 (not Expanded View).

Figure 13:
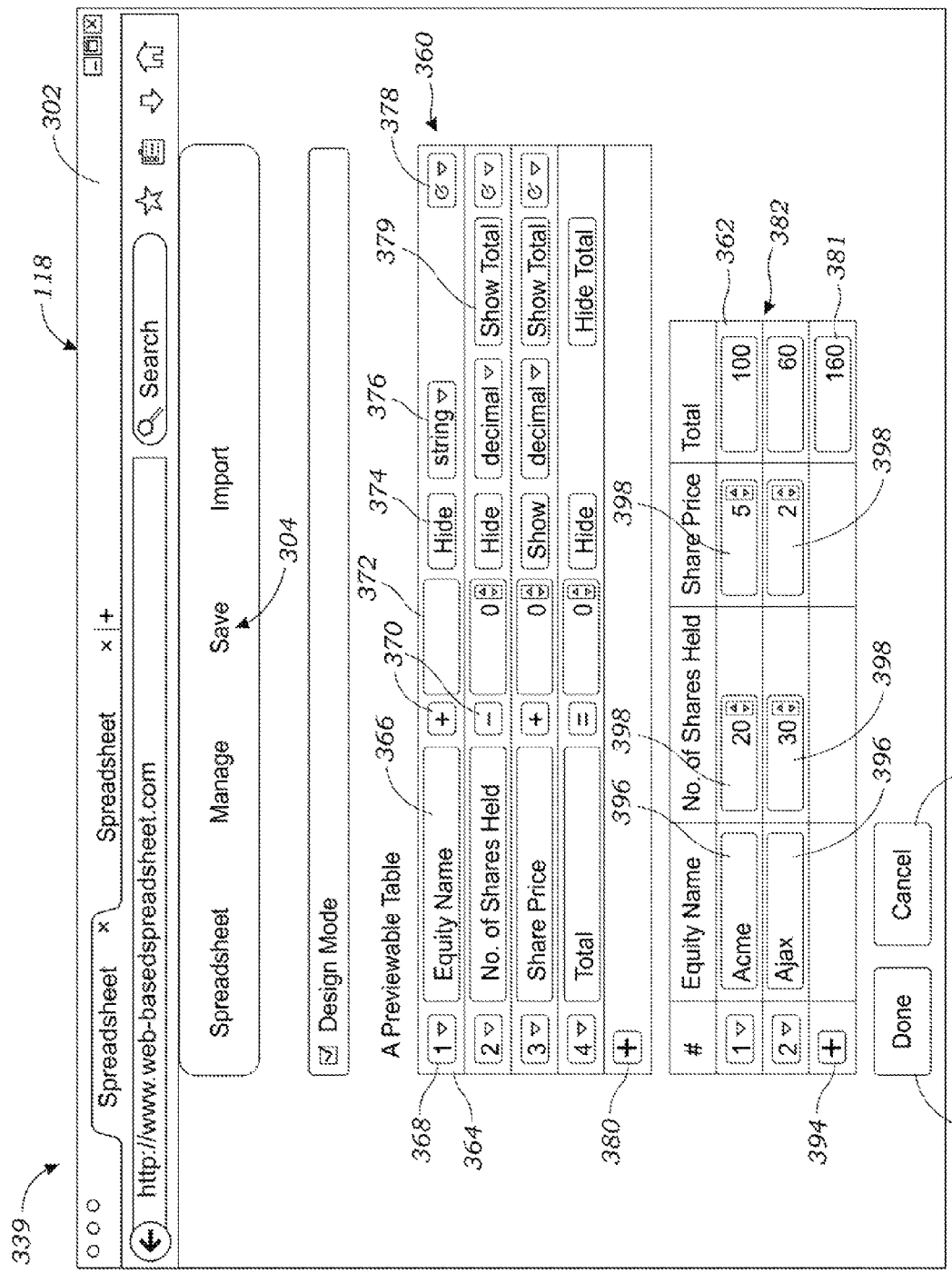

Selecting the "Edit Column Series" function of the function editing dropdown menu 333 allows a table having multiple columns to be inserted into a line 318 of the spreadsheet 301 for defining the value of the line value box 326 of the particular line 318. Referring to FIG. 13, a screen shot 339 is shown which displays an column series building screen 360 for creating a multiple column table 362 for line 3 of the spreadsheet 301 as shown in FIG. 11. The column series building screen 360 has one or more lines 364 in which each line defines a column in the column table 362. Each line 364 includes a fill-able column description text box 366, a column line number 368, a column function selection 370, a column value box 372, a "Hide" column command 374, a column value format selection 376, and a column function editing menu 378. Each line 364 also has a "Show Total" selection which when selected inserts a total 381 into the column which is a total of the line value boxes for the particular column The "Show Total" selection is a toggle selection, similar to the "Hide" selection, and toggles between "Show Total" and "Hide Total."

The column series building screen 360 also has an add line command 380 which when selected add another line 364 for adding a column to the column table 362. In the Design Mode for the column series building screen 360, a preview panel 382 is also displayed which shows a preview of the column table 362 of the spreadsheet 301 as defined by the lines 364 of the column series building screen 360. In other words, as each line 364 is created and completed, such as by filling in the column description text box 366 which creates a description text box 396 for each row in the respective column of the column table 362, the column function selection 370, the column value box 372 which creates a line value box 398 for each row in the respective column of the column table 362, the column value format selection 376, and/or a column function editing menu 378, the column as defined by the particular line 364 is created in the column table 362 in the preview panel 382. Then, rows in the column table 362 may be added by filling in the table value boxes 398 for each row created in the column table 362. In another feature, the preview panel 382 also performs the calculations as defined by the functions input into each of the lines 364 of the column series building screen 360. Accordingly, a user can enter test data into the preview panel 382, such as adding rows to the column table 362 and entering text into the description text boxes 396 and values into the table value boxes 398, and seeing the calculated results of the column table 362.

Figure 14:
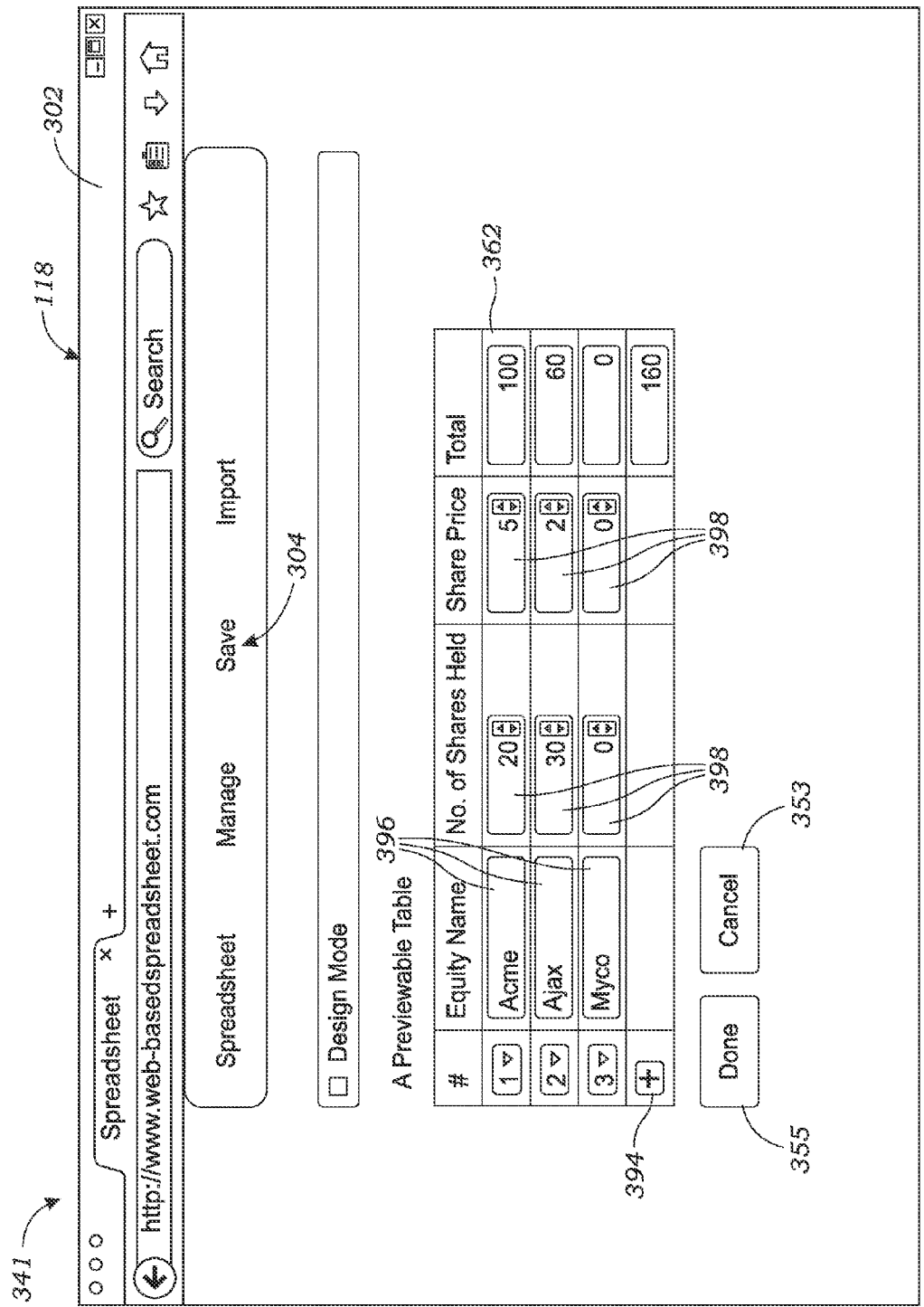

The Design Mode selection for the column series building screen 360 operates as described above. Accordingly, FIG. 13 shows an example of a column series building screen 360, and column table 362 in the preview panel 382 in the Design Mode. FIG. 14 shows the same column table 362 in the User Mode (i.e. with the Design Mode de-selected), except with one additional row added to the column table 362. In the User Mode of the column table 362, there is no preview table, and as described above, the table creation functions are not available.

The column series building screen 360 has a "Done" button which operates the same as the "Save" button 345 described above, and a "Cancel" button 353 which operates the same as the "Cancel" button 347 described above. Upon selecting the "Done" button in the column series building screen 360 in FIG. 13 or FIG. 14, the spreadsheet 301 is displayed as shown in the screen shot 343 of FIG. 15.

FIG. 15 shows the spreadsheet 301 having the column table 362 inserted into line 3. FIG. 15 shows the spreadsheet 301 in the User Mode and in the Expanded View. Thus, the column table 362 is shown in line 3 of the spreadsheet 301. FIG. 16 is a screen shot 345 showing the same spreadsheet 301 of FIG. 15 in the User Mode and in the non-Expanded View (i.e. with the Expanded View de-selected). In the User Mode, each line 318 of a spreadsheet having a line function from the function editing menu 332 (e.g. a Line Items function, an embedded worksheet, or a column table) has a function input data button 390. Upon selection of the function input data button 390, the web application 106 displays a function input data screen 392, as shown in the screen shot 347 of FIG. 17. In the function input data screen 392, the end user can enter descriptions into the description text boxes 396, enter values into the line value boxes 398, and add lines to the line function by selecting the add line/row button 394. When the end user has finished inputting data into the function input data screen 392, the end user selects the "Done" or "Cancel" button, which operate the same as the "Done" and "Cancel" buttons described above. For example, upon selecting the "Done" button on the function input data screen 392 of FIG. 17, the spreadsheet 301 is displayed with the column table 362 having the data as input by the user on the input data screen 392 in line 3 of the spreadsheet 301, as shown in the screen shot 349 of FIG. 18.

While the web-based spreadsheet web application 106 may have a User Mode in which certain fields of the spreadsheet 301 are not changeable by the user, the web application 106 can still be toggled between the Design Mode and the User Mode. Thus, it may be desirable to create an end-user version of the spreadsheet in which one or more of the fields (e.g. the text boxes (such as 320 or 396) and/or line value boxes (such as 326 or 398) of the spreadsheet is locked from being modified by the end-user. After creating a spreadsheet 301 as described above, the user sends the spreadsheet 301 to the website 104 and the web server 102 receives the spreadsheet 301. The web server 102 has an end-user spreadsheet engine 105 configured to generate an end-user spreadsheet application 128 of the spreadsheet 301 in which one or more of the text boxes (e.g. 320 or 396) and/or line value boxes (e.g. 326 or 398) of the spreadsheet is locked from being modified by the end-user and at least one text box and/or line value box which allows the end-user to enter user data into the field. For instance, the end-user spreadsheet application 128 may display and execute a spreadsheet which is the same as the End-User mode of the spreadsheet 301 as described above and shown in FIGS. 15-18. The end-user spreadsheet application 128 is configured to display and execute the end-user spreadsheet application 128 on a web browser 118 of an end-user computer 130 (see FIG. 1) which may be same or similar to the user computer 116. The web server 102 is configured to transmit the end-user spreadsheet application 128 to the web browser 118 of the end user computer 130 via the internet 110. This may be done same or similar to transmitting the web-based spreadsheet web application 106 to a user, as described above.

Accordingly, a web-based spreadsheet system 100 is provided for creating an electronic spreadsheet using a web-based spreadsheet application. In addition, any and all method embodiments implemented by the system 100 and/or its components for creating an electronic spreadsheet using a web-based spreadsheet application have also been provided.

The methods embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform the described methods. The computer program carrier is readable by a computer and embodies instructions executable by the computer to perform the method steps of programming a computer to perform the methods implemented by the system 100 and/or its components, as described herein. Carriers may be, for example, magnetic storage medium, optical storage medium and magneto-optical storage medium. Examples of carriers include, but are not limited to, a floppy diskette, a memory stick or a flash drive, a hard drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while multiple embodiments and variations of the many aspects of the invention have been disclosed and described herein, such disclosure is provided for purposes of illustration only. Where methods and steps described above indicate certain events occurring in certain order, those of ordinary skill in the art having the benefit of this disclosure would recognize that the ordering of certain steps may be modified and that such modifications are in accordance with the variations of the invention. Additionally, certain of the steps may be performed concurrently in a parallel process as well as performed sequentially.

Accordingly, embodiments are intended to exemplify alternatives, modifications, and equivalents that may fall within the scope of the claims.

What is claimed is:

1. A system for creating a spreadsheet for receiving input data and performing one or more calculations and/or functions using the input data, comprising:
   a web-server hosting a web-based spreadsheet website, the web-server comprising one or more computer processors, memory and data storage;
   the web-based spreadsheet website configured to transmit to a web-browser of a user computing device a spreadsheet web application in a web-browser programming language for programming the web-browser to run the spreadsheet web application, the spreadsheet web application configured to display and execute a web spreadsheet interface comprising a design section having a plurality of user-selectable spreadsheet commands and functions for adding columns in creating a spreadsheet, the design section configured to design a spreadsheet in a line by line sequence in which each line in the design section defines a column of a spreadsheet, and a preview panel separate from the design section which displays a spreadsheet preview of a spreadsheet in an end-user mode as the spreadsheet is being created using the design section, the preview panel having a user selectable command to add rows to the spreadsheet displayed in the spreadsheet preview.

2. The system of claim 1, wherein the spreadsheet web application is further configured such that test data can be entered into the spreadsheet preview and the spreadsheet preview calculates the spreadsheet according to a design of a spreadsheet in the design section.

3. The system of claim 1, wherein the spreadsheet web application is further configured such that a spreadsheet is created without a starting grid of rows and columns, and in which rows and/or columns of a spreadsheet are formed only as the rows and/or columns are added by using the design section.

4. The system of claim 1, wherein the spreadsheet web application is further configured such that a line of a spreadsheet references a second spreadsheet created using the spreadsheet web application.

5. The system of claim 1, wherein the spreadsheet web application is further configured with an embedded worksheet function to embed a worksheet within a first line of a first spreadsheet, the embedded worksheet function configured to create an embedded worksheet comprising a second spreadsheet different from the first spreadsheet in which a value of the second spreadsheet is used by the first line in executing the first spreadsheet.

6. The system of claim 5, wherein the embedded worksheet function is configured to recursively embed a different referenced spreadsheet in a referencing spreadsheet in which a value of the referenced spreadsheet is used by a line of the referencing spreadsheet in executing the referencing spreadsheet.

7. The system of claim 5, wherein the spreadsheet web application is configured to display the embedded worksheet in the first line.

8. The system of claim 1, wherein the web-based spreadsheet website is further configured to: receive from the user computing device a first spreadsheet created using the spreadsheet web application, save the first spreadsheet on the storage device; generate an end-user spreadsheet application of the first spreadsheet in which at least one locked field of the first spreadsheet is locked from being modified by an end-user and at least one data field allows an end-user to enter user data into the data field, the end-user spreadsheet web application configured to display and execute the first spreadsheet on a web browser of a computing device; and transmit the end-user spreadsheet web application to a web browser of an end-user computing device.

9. The system of claim 1, wherein the web-browser programming language is one or more of the following: JAVA, JAVASCRIPT, HTML, or scripting language for a web-browser.

10. A system for creating a spreadsheet for receiving input data and performing one or more calculations using the input data, comprising:
    a computing device comprising a computer processor, memory, data storage and a network communication adapter;
    the computing device further comprising a web-browser and a spreadsheet web application in a web-browser programming language which programs the web-browser to execute the spreadsheet web application, the spreadsheet web application configured to display and execute a web spreadsheet interface comprising a design section having a plurality of user-selectable spreadsheet commands and functions for creating a spreadsheet, the design section configured to design a spreadsheet in a line by line sequence in which each line in the design section defines a column of a spreadsheet, and a preview panel separate from the design section which displays a spreadsheet preview of a spreadsheet in an end-user mode as the spreadsheet is being created using the design section, the preview panel having a user selectable command to add rows to the spreadsheet displayed in the spreadsheet preview;
    the spreadsheet web application further comprising an embedded worksheet function to embed a worksheet within a first line of a first spreadsheet, the embedded worksheet function configured to create an embedded worksheet comprising a second spreadsheet different from the first spreadsheet in which a value of the second spreadsheet is used by the first line in executing the first spreadsheet;
    wherein the spreadsheet web application is configured to display the embedded worksheet in the first line.

11. The system of claim 10, wherein the embedded worksheet function is configured to recursively embed a different referenced spreadsheet in a referencing spreadsheet in which a value of the referenced spreadsheet is used by a line of the referencing spreadsheet in executing the referencing spreadsheet.

12. The system of claim 10, wherein the spreadsheet web application is further configured such that a spreadsheet is created without a starting grid of rows and columns, and in which rows and/or columns of a spreadsheet are formed only as the rows and/or columns are added by using the design section.

13. The system of claim 10, wherein the spreadsheet web application is further configured to allow a user to designate at least one locked field from being modified by an end-user and to designate at least one data field which allows an end-user to enter user data into the data field.

14. The system of claim 10, wherein the spreadsheet web application is further configured such that test data can be entered into the spreadsheet preview and the spreadsheet preview calculates the spreadsheet according to the design of a spreadsheet in the design section.

15. The system of claim 10, wherein the web-browser programming language is one or more of the following: JAVA, JAVASCRIPT, HTML, or scripting language for a web-browser.

16. A method for creating a spreadsheet for receiving input data and performing one or more calculations using the input data, comprising:
a web-server transmitting a spreadsheet web application to a web-browser of a user computing device, the spreadsheet web application in a web-browser programming language for programming the web-browser to execute the spreadsheet web application, the web-server comprising one or more computer processors, memory and data storage and hosting a web-based spreadsheet web site;
wherein the spreadsheet web application is configured to display and execute on the user computing device a spreadsheet web interface comprising a design section having a plurality of user-selectable spreadsheet commands and functions for creating a spreadsheet, the spreadsheet web application configured to create a spreadsheet in a line by line sequence without a starting grid of rows and columns in which each line in the design section defines a column of a spreadsheet, and in which rows and/or columns of a spreadsheet are formed only as the rows and/or columns are added by using the design section, and a preview panel separate from the design section which displays a spreadsheet preview of a spreadsheet in an end-user mode as the spreadsheet is being created using the design section, the preview panel having a user selectable command to add rows to the spreadsheet displayed in the spreadsheet preview.

17. The method of claim 16, wherein the spreadsheet web application is further configured with an embedded worksheet function to embed a worksheet within a first line of a referencing spreadsheet, the embedded worksheet function configured to create an embedded worksheet comprising a referenced spreadsheet different from the referencing spreadsheet in which a value of the referenced spreadsheet is used by the first line in executing the referencing spreadsheet.

18. The system of claim 17, wherein the spreadsheet web application is configured to display the embedded worksheet in the first line.

19. The method of claim 17, wherein the embedded worksheet function is configured to recursively embed a different referenced spreadsheet in a referencing spreadsheet in which a value of the referenced spreadsheet is used by a line of the referencing spreadsheet in executing the referencing spreadsheet.

20. The method of claim 16, further comprising:
the web-server receiving from the user computing device a first spreadsheet created using the spreadsheet web application;
the web-server storing the first spreadsheet on the storage device;
the web-server generating an end-user spreadsheet application of the first spreadsheet in which at least one locked field of the first spreadsheet is locked from being modified by an end-user and at least one data field allows an end-user to enter user data into the data field, the end-user spreadsheet web application configured to display and execute the first spreadsheet on a web-browser of a computing device;
the web-server transmitting the end-user spreadsheet web application to a web browser of an end-user computing device.

21. The method of claim 16, wherein the spreadsheet web application is further configured such that test data can be entered into the spreadsheet preview and the spreadsheet preview calculates the spreadsheet according to the design of a spreadsheet in the design section.

22. The method of claim 16, wherein the web-browser programming language is one or more of the following: JAVA, JAVASCRIPT, HTML, or scripting language for a web-browser.

23. A method for creating a spreadsheet for receiving input data and performing one or more calculations using the input data, comprising:
a computing device receiving from a web-based spreadsheet website via the internet a spreadsheet web application in a web-browser programming language, the computing device comprising a computer processor, memory, data storage, a web-browser, and a network communication adapter;
the computing device executing the spreadsheet web application which programs the web-browser to execute the spreadsheet web application;
the spreadsheet web application displaying and executing a spreadsheet web interface comprising a design section having a plurality of user-selectable spreadsheet commands and functions for creating a spreadsheet, the design section configured to design a spreadsheet in a line by line sequence in which each line in the design section defines a column of a spreadsheet, and a preview panel separate from the design section which displays a spreadsheet preview of a spreadsheet in an end-user mode as the spreadsheet is being created using the design section, the preview panel having a user selectable command to add rows to the spreadsheet displayed in the spreadsheet preview, the spreadsheet web application configured with an embedded worksheet function to embed a worksheet within a first line of a first spreadsheet, the embedded worksheet function configured to create an embedded worksheet comprising a second spreadsheet different from the first spreadsheet in which a value of the second spreadsheet is used by the first line in executing the first spreadsheet the spreadsheet web application configured to selectively display the embedded worksheet in the first line in response to a command from a user.

24. The method of claim 23, further comprising:
the computing device receiving a command from a user to display the embedded worksheet in the first line.

25. The method of claim 24, further comprising:
the computing device transmitting a first spreadsheet created using the spreadsheet web application to the web-based spreadsheet website.

26. An article of manufacture comprising a non-transitory computer program carrier readable by a computer and embodying instructions executable by the computer to perform a method for creating a spreadsheet for receiving input data and performing one or more calculations using the input data, comprising:

transmitting a spreadsheet web application to a web-browser of a user computing device via the internet, the spreadsheet web application in a web-browser programming language for programming the web-browser to execute the spreadsheet web application, the web-server comprising one or more computer processors, memory and data storage and hosting a web-based spreadsheet web site;

wherein the spreadsheet web application is configured to display and execute on the user computing device a spreadsheet web interface comprising a design section having a plurality of user-selectable spreadsheet commands and functions for creating a spreadsheet, the spreadsheet web application configured to create a spreadsheet in a line by line sequence without a starting grid of rows and columns in which each line in the design section defines a column of a spreadsheet, and in which rows and/or columns of a spreadsheet are formed only as the rows and/or columns are added by using the design section, and a preview panel separate from the design section which displays a spreadsheet preview of a spreadsheet in an end-user mode as the spreadsheet is being created using the design section, the preview panel having a user selectable command to add rows to the spreadsheet displayed in the spreadsheet preview.

\* \* \* \* \*